(12) United States Patent
Tsuda et al.

(10) Patent No.: US 8,797,348 B2
(45) Date of Patent: Aug. 5, 2014

(54) IMAGE DISPLAY APPARATUS, IMAGE DISPLAY METHOD, AND INFORMATION STORAGE MEDIUM

(75) Inventors: Munetaka Tsuda, Tokyo (JP); Yoshinobu Matono, Saitama (JP); Masato Hirabayashi, Saitama (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 388 days.

(21) Appl. No.: 12/810,118

(22) PCT Filed: Jun. 30, 2009

(86) PCT No.: PCT/JP2009/061941
§ 371 (c)(1),
(2), (4) Date: Sep. 8, 2010

(87) PCT Pub. No.: WO2010/061661
PCT Pub. Date: Jun. 3, 2010

(65) Prior Publication Data
US 2011/0181617 A1    Jul. 28, 2011

(30) Foreign Application Priority Data

Nov. 25, 2008  (JP) ................................ 2008-299850
Nov. 25, 2008  (JP) ................................ 2008-299851
Nov. 25, 2008  (JP) ................................ 2008-299852
Nov. 25, 2008  (JP) ................................ 2008-299853

(51) Int. Cl.
*G09G 5/00*           (2006.01)
(52) U.S. Cl.
USPC ........................................................ 345/619
(58) Field of Classification Search
USPC ........................................................ 345/619
See application file for complete search history.

(56) References Cited

U.S. PATENT DOCUMENTS 6,990,637 B2     1/2006  Anthony et al.
7,469,064 B2 *  12/2008  Furuya et al. ................. 382/195
(Continued)

FOREIGN PATENT DOCUMENTS

EP       1052849 A1     11/2000
EP       1676234 A2      7/2006
(Continued)

OTHER PUBLICATIONS

International Preliminary Report on Patentability for corresponding Application No. PCT/JP2009/061941, Jul. 5, 2011.
(Continued)

*Primary Examiner* — Kee M Tung
*Assistant Examiner* — William Beutel
(74) *Attorney, Agent, or Firm* — Matthew B. Dernier, Esq.; Gibson & Dernier LLP

(57) ABSTRACT

Provided is an image display apparatus capable of allowing a user to easily recognize an image belonging to a group. A library view image classifying unit classifies a plurality of images into groups which have a rank order associated therewith. A library view group image layout unit places a group image corresponding to each of the groups according to the rank order of the groups, along a group image layout reference line provided in a display region. A library view representative image layout unit places, on a representative image layout region in the display region, an image belonging to any one of the groups falling within a range on the group image layout reference line associated with the representative image layout region, as a representative image. A library view space displaying unit displays at least part of the display region on a screen.

8 Claims, 20 Drawing Sheets

(56) References Cited

U.S. PATENT DOCUMENTS

| | | | |
|---|---|---|---|
| 7,600,192 B1* | 10/2009 | Hashimoto et al. | 715/802 |
| 2005/0001933 A1 | 1/2005 | Yoshikawa et al. | |
| 2005/0008264 A1* | 1/2005 | Iida et al. | 382/305 |
| 2005/0091596 A1 | 4/2005 | Anthony et al. | |
| 2005/0289482 A1 | 12/2005 | Anthony et al. | |
| 2006/0139461 A1 | 6/2006 | Matsui et al. | |
| 2007/0019018 A1* | 1/2007 | Wakai | 347/14 |
| 2008/0216005 A1* | 9/2008 | Bamba et al. | 715/765 |
| 2011/0242361 A1* | 10/2011 | Kuwahara et al. | 348/231.4 |

FOREIGN PATENT DOCUMENTS

| | | | |
|---|---|---|---|
| EP | 1923835 A1 | 5/2008 | |
| JP | 584219 A | 4/1993 | |
| JP | 200531830 A | 2/2005 | |
| JP | 200532219 A | 2/2005 | |
| JP | 2005222311 A | 8/2005 | |
| JP | 2006172090 A | 6/2006 | |
| JP | 2007509403 A | 4/2007 | |
| JP | 2007193592 A | 8/2007 | |
| WO | 0033571 A1 | 6/2000 | |
| WO | 2005045756 A2 | 5/2005 | |

OTHER PUBLICATIONS

International Search Report for corresponding PCT application No. PCT/JP2009/061941, Oct. 6, 2009.

Japanese Office Action for corresponding Japanese Patent Application No. 2008-299850, Aug. 2, 2011.

Extended European Search Report for corresponding EP Application No. 09828911, dated Dec. 4, 2012.

Drucker S. et al; "MediaBrowser: reclaiming the shoebox" Proceeding of the Workshop on Advanced Visual Interfaces AVI, XX, XX, pp. 433-436, May 25, 2004.

Office Action for corresponding Japanese Patent application No. 2008-299852, dated Jan. 22, 2013.

Office Action for corresponding Japanese Patent application No. 2008-299853, dated Jan. 22, 2013.

\* cited by examiner

IMAGE DISPLAY APPARATUS, IMAGE DISPLAY METHOD, AND INFORMATION STORAGE MEDIUM

TECHNICAL FIELD

The present invention relates to an image display apparatus, an image display method, and an information storage medium.

BACKGROUND ART

In recent years, people possess a huge number of images, including images captured by using a digital camera and images acquired via the Internet, and there are known various kinds of computer software for efficiently viewing such images.

For example, according to software for classifying images into groups based on the shooting date thereof and the like and displaying each image with identification of the group to which the image belong, a user is allowed to browse a large number of images with ease. Specifically, there is software for collectively displaying images which belong to the same group on an image depicting a folder. Alternatively, there is another software for displaying images which belong to the same group, at a predetermined spot on an image depicting a table, the images being overlapped in part with one another.

Further, the computer software as described above often employs a cursor image for designating, from among a plurality of images, an image as a target image to be subjected to processing such as processing of selecting an image to be subjected to enlarged display. The cursor image may be displayed, for example, as an arrow image superimposed on an image to be designated, or as a frame image enclosing the image to be designated.

Further, there is an apparatus for displaying display elements such as an icon indicating the presence of a file or a folder, a moving image, and a still image. A cursor image is generally employed in a personal computer or the like, for identifying one of the display elements such as an icon indicating the presence of a file or a folder, a moving image, and a still image. Then, the user moves the cursor image using operating means such as a keyboard or a mouse. When the user instructs processing such as display processing through the operating means (for example, by clicking the mouse) while designating one of the plurality of display elements, processing such as display processing is performed with respect to the display element thus designated.

Patent Literature 1 discloses technology relating to a facial image display apparatus for displaying images of people's faces.

PRIOR ART DOCUMENT

Patent Literature
Patent Literature 1: EP 1,923,835 A

However, according to the conventional software, when images belonging to a group are displayed on a screen while the group to which the images belong is identified, it has been often the case that each image is displayed in a small-sized region on the screen. Therefore, according to the conventional software, it has been difficult to allow the user to readily identify the images belonging to the group.

Further, when the cursor image such as an arrow image is displayed superimposed on an image to be designated, the image to be designated itself is made difficult to see, which results in inconvenience for the user. On the other hand, the cursor image in a frame shape enclosing the image to be designated does not focus on a single point, which makes it difficult to identify the point designated by the cursor image when no image is selected.

Meanwhile, if the display elements are displayed enlarged on the screen so that the number of the display elements may be limited to a small number, or if the display elements are displayed reduced in size so that a large number of the display elements may be displayed on the screen, the display elements may be displayed in different ways according to the need of the user, for example, the display elements may be displayed in large numbers as an overview, or the display elements may be displayed in small numbers for detail, which improves convenience for the user. However, according to the conventional technology, the mode of distinguishing a display element by using a cursor image or the like is unchanged regardless of whether the display elements are displayed in large numbers or in small numbers on the screen. Accordingly, when the mode of distinguishing (for example, highlightning) a display element from among the display elements displayed in large numbers is employed for distinguishing a display element from among the display elements displayed in small numbers, the user may be given an impression that excessive distinction has been made (for example, an impression that the distinctiveness is overwhelming). In this case, when the display elements are displayed in small numbers, the user may find it difficult to identify a distinguished display element.

Further, the display elements such as images belonging to a group may be associated with a rank order within the group. Specifically, for example, display elements belonging to a group classified according to the shooting date may be sorted by shooting time, to thereby associate the display elements with a rank order. In such a case, it is preferable that the user may be allowed to easily recognize the rank order of the display elements in the group. However, according to the conventional software, the display elements are displayed with identification of the group to which the display elements belong, whereas the rank order of the images in the group is not necessarily presented to the user in a readily recognizable manner.

SUMMARY OF THE INVENTION

The present invention has been made in view of the above-mentioned problems, and it is therefore an object of the invention to provide an image display apparatus, an image display method, and an information storage medium, which are capable of allowing the user to easily recognize images belonging to a group.

It is another object of the present invention to provide an image display apparatus, an image display method, and an information storage medium, which are provided with a cursor function capable of designating a target image in a readily recognizable manner without obstructing a view to the target image.

It is further another object of the present invention to provide an image display apparatus, an image display method, and an information storage medium, which are capable of allowing the user to easily identify a distinguished display element when the display element is displayed enlarged or reduced in size according to the need of the user.

It is still further another object of the present invention to provide an image display apparatus, an image display method, and an information storage medium, which are capable of presenting, with regard to a plurality of display elements collectively displayed, the rank of each display element in the plurality of display elements, to the user in a readily recognizable manner.

In order to solve the above-mentioned problems, an image display apparatus according to the present invention includes: image acquiring means for acquiring a plurality of images; image classifying means for classifying the plurality of images into one or a plurality of groups having a rank order associated therewith; group image layout means for placing a group image corresponding to each of the plurality of groups, according to the rank order of the groups, along a group image layout reference line provided in a display region; representative image layout means for placing, on a representative image layout region in the display region, at least one image of the plurality of images, the at least one image belonging to any one of the plurality of groups falling within a range on the group image layout reference line associated with the representative image layout region, as a representative image; and displaying means for displaying, on a screen, at least part of the display region.

Further, an image display method according to the present invention includes: an image acquiring step of acquiring a plurality of images; an image classifying step of classifying the plurality of images into one or a plurality of groups having a rank order associated therewith; a group image layout step of placing a group image corresponding to each of the plurality of groups, according to the rank order of the groups, along a group image layout reference line provided in a display region; a representative image layout step of placing, on a representative image layout region in the display region, at least one image of the plurality of images, the at least one image belonging to any one of the plurality of groups falling within a range on the group image layout reference line associated with the representative image layout region, as a representative image; and a displaying step of displaying, on a screen, at least part of the display region.

Further, a computer-readable information storage medium according to the present invention stores a program for causing a computer to function as: image acquiring means for acquiring a plurality of images; image classifying means for classifying the plurality of images into one or a plurality of groups having a rank order associated therewith; group image layout means for placing a group image corresponding to each of the plurality of groups, according to the rank order of the groups, along a group image layout reference line provided in a display region; representative image layout means for placing, on a representative image layout region in the display region, at least one image of the plurality of images, the at least one image belonging to any one of the plurality of groups falling within a range on the group image layout reference line associated with the representative image layout region, as a representative image; and displaying means for displaying, on a screen, at least part of the display region.

According to the present invention, an image belonging to any one of the one or the plurality of groups into which the plurality of images are classified is placed, as a representative image, on the representative image layout region in the display region. Further, the representative image layout region falls within a range on the group image layout reference line in the display region. Further, at least part of the display region is displayed to the user. Accordingly, images belonging to the group may be readily recognized by the user.

According to one aspect of the present invention, the image display apparatus further includes representative image layout region determining means for determining a position of the representative image layout region, based on at least one of a position of the group image layout reference line and a position at which the group image is placed. With this configuration, the representative image layout region may be determined with consideration given to the position of the group image layout reference line or to the position at which the group image is placed.

Further, according to one aspect of the present invention, the representative image layout means places, as the representative image, at least one image of the plurality of images, the at least one image belonging to any one of the plurality of groups falling within a range on the group image layout reference line determined based on a distance from a representative point in the representative image layout region. With this configuration, an image to be placed as the representative image may be determined based on the positional relation between the representative point in the representative image layout region and the range on the group image layout reference line.

Further, according to one aspect of the present invention, the representative image layout means places, as the representative image, at least one image of the plurality of images, the at least one image belonging to any one of the plurality of groups of consecutive ranks. With this configuration, the representative image may be associated with the groups of consecutive ranks.

Further, according to one aspect of the present invention, the representative image layout means places, as the representative image, at least one image of the plurality of images, the at least one image being selected based on a random number. With this configuration, the representative image may be determined at random, from among the plurality of images.

Further, according to one aspect of the present invention, the representative images are switched at predetermined time intervals. With this configuration, a plurality of the representative images which are switched at predetermined time intervals are placed in a single representative image layout region.

Further, according to one aspect of the present invention, the image classifying means classifies the plurality of images into the one or the plurality of groups, based on an attribute associated with each of the plurality of images. With this configuration, an image belonging to any one of the one or the plurality of groups into which the plurality of images are classified based on an attribute associated with each of the plurality of images may be placed, as the representative image, on the representative image layout region in the display region.

Further, according to one aspect of the present invention, the display region has a plurality of the representative image layout regions provided therein. With this configuration, an image belonging to any one of the groups falling within the range on the group image layout reference line associated with each of the representative image layout region may be placed as the representative image.

In this aspect, the representative image layout means may place, in one of the plurality of the representative image layout regions, an image as the representative image in the one of the plurality of the representative image layout regions, the image being different from an image placed in another one of the plurality of the representative image layout regions which is spaced apart from the one of the plurality of the representative image regions at a distance falling within a predetermined range from a representative point in the one of the plurality of the representative image layout regions. With this configuration, it is possible to prevent a case where an image belonging to any one of the groups falling within the range on the group image layout reference line associated in common with a plurality of the representative image layout regions is redundantly placed in some of the plurality of the representative image layout regions.

Further, another image display apparatus according to the present invention displays an image illustrating a scene viewed in line of sight from a viewpoint disposed in a virtual three dimensional space, the another image display apparatus including: target image layout means for placing at least one target image on a layout plane in the virtual three dimensional space; cursor image layout means for placing, on the layout plane, a cursor image indicating a closed region; cursor image moving means for moving the cursor image along the layout plane, in response to an operation signal received from a user; and image positional relation changing means for changing a relative positional relation between the cursor image and the target image such that a distance from the viewpoint to the target image becomes smaller than a distance from the viewpoint to the cursor image, in a case where a distance between a position of the cursor image and a position of the target image on the layout plane falls within a predetermined range.

Further, another image display method according to the present invention is an image display method of displaying an image illustrating a scene viewed in line of sight from a viewpoint disposed in a virtual three dimensional space, the image display method including: a target image layout step of placing at least one target image on a layout plane in the virtual three dimensional space; a cursor image layout step of placing, on the layout plane, a cursor image indicating a closed region; a cursor image moving step of moving the cursor image along the layout plane, in response to an operation signal received from a user; and an image positional relation changing step of changing a relative positional relation between the cursor image and the target image such that a distance from the viewpoint to the target image becomes smaller than a distance from the viewpoint to the cursor image, in a case where a distance between a position of the cursor image and a position of the target image on the layout plane falls within a predetermined range.

Further, another computer-readable information storage medium according to the present invention stores a program for causing a computer to function as an image display apparatus for displaying an image illustrating a scene viewed in line of sight from a viewpoint disposed in a virtual three dimensional space, the program further causing the computer to function as: target image layout means for placing at least one target image on a layout plane in the virtual three dimensional space; cursor image layout means for placing, on the layout plane, a cursor image indicating a closed region; cursor image moving means for moving the cursor image along the layout plane, in response to an operation signal received from a user; and image positional relation changing means for changing a relative positional relation between the cursor image and the target image such that a distance from the viewpoint to the target image becomes smaller than a distance from the viewpoint to the cursor image, in a case where a distance between a position of the cursor image and a position of the target image on the layout plane falls within a predetermined range.

According to the present invention, in a case where a distance between the position of the cursor image and the position of the target image falls within a predetermined range, the target image is placed closer on the viewpoint side with respect to the cursor image, to thereby prevent a view to the target image from being obstructed. Further, in the case where the distance between the position of the cursor image and the position of the target image falls within a predetermined range, the relative positional relation between the cursor image and the target image changes, to thereby present the target image to be designated to the user in a readily recognizable manner. Accordingly, the image to be designated may be presented to the user in a readily recognizable manner, without obstructing a view to the image.

According to one aspect of the present invention, the image positional relation changing means changes a distance from the layout plane to the target image. With this configuration, the distance between the target image and the layout plane changes, to thereby present the target image to be designated to the user in a readily recognizable manner.

Further, according to one aspect of the present invention, the cursor image is larger in size than the target image. With this configuration, the position of the cursor image may be recognized by the user even in a case where the target image is placed between the viewpoint and the cursor image.

Further, according to one aspect of the present invention, the cursor image moving means brings the cursor image and the target image closer to each other according to a distance between a representative point in the cursor image and a representative point in the target image, in a case where the distance between the position of the cursor image and the position of the target image on the layout plane falls within a predetermined range. With this configuration, the cursor image and the target image are moved closer to each other as long as the distance between the position of the cursor image and the position of the target image falls within a predetermined range, to thereby facilitate the designation of the target image.

Further, still another image display apparatus according to the present invention includes: image displaying means for displaying an image on a screen, the image illustrating at least part of a region having a plurality of display elements laid out thereon; distinctive display means for displaying distinctively at least one of the plurality of display elements displayed on the screen; region size changing means for changing a size of the region to be displayed on the screen, in response to an operation signal received from a user; and distinctiveness degree changing means for changing a degree of the distinctiveness, according to the change in size of the region to be displayed on the screen.

Further, still another image display method according to the present invention includes: an image displaying step of displaying an image on a screen, the image illustrating at least part of a region having a plurality of display elements laid out thereon; a distinctive display step of displaying distinctively at least one of the plurality of display elements displayed on the screen; a region size changing step of changing a size of the region to be displayed on the screen, in response to an operation signal received from a user; and a distinctiveness degree changing step of changing a degree of the distinctiveness, according to the size of the region to be displayed on the screen.

Further, still another computer-readable information storage medium according to the present invention stores a program for causing a computer to function as: image displaying means for displaying an image on a screen, the image illustrating at least part of a region having a plurality of display elements laid out thereon; distinctive display means for displaying distinctively at least one of the plurality of display elements displayed on the screen; region size changing means for changing a size of the region to be displayed on the screen, in response to an operation signal received from a user; and distinctiveness degree changing means for changing a degree of the distinctiveness, according to the size of the region to be displayed on the screen.

According to the present invention, when a region to be displayed on the screen is changed in size in response to an operation signal received from the user, the degree of distinguishing the display element is also varied according to the change in the size, which allows the user to readily recognize the distinguished display element when the display element is displayed enlarged or reduced in size according to the need of the user.

According to one aspect of the present invention, the image displaying means displays an image on a screen, the image illustrating a display element layout plane in a virtual three dimensional space, the display element layout plane having the plurality of display element objects laid out thereon, as a scene viewed in line of sight from a viewpoint disposed in the virtual three dimensional space, the distinctive display means displays distinctively at least one of the plurality of display element objects displayed on the screen, the region size changing means changes a distance between the viewpoint and the display element layout plane, in response to an operation signal received from the user, and the distinctiveness degree changing means changes a distance to the display element object from the display element layout plane, according to the change in distance between the viewpoint and the display element layout plane. With this configuration, when the distance between the viewpoint and the display element layout plane is changed in response to an operation signal received from the user, the degree of distinguishing the display element is also varied according to the change in the distance, which allows the user to readily recognize the distinguished display element when the display element is displayed enlarged or reduced in size according to the need of the user.

Further, according to one aspect of the present invention, the image display apparatus further includes cursor image layout means for placing a cursor image designating at least one of the plurality of display elements, at a position corresponding to the at least one of the plurality of display elements which is displayed distinctively, and the distinctiveness degree changing means changes a display mode of the cursor image. With this configuration, when the region to be displayed on the screen is changed in size in response to an operation signal received from the user, the display mode of the cursor image is also varied according to the change in the size, which allows the user to readily recognize the distinguished display element when the display element is displayed enlarged or reduced in size according to the need of the user.

In this aspect, the distinctiveness degree changing means may change transparency of the cursor image. With this configuration, when the region to be displayed on the screen is changed in size in response to an operation signal received from the user, the transparency of the cursor image is also varied according to the change in the size, which allows the user to readily recognize the distinguished display element when the display element is displayed enlarged or reduced in size according to the need of the user.

Further, still another image display apparatus according to the present invention displays an image illustrating a scene viewed in line of sight from a viewpoint disposed in a virtual three dimensional space, the still another image display apparatus including: display element acquiring means for acquiring a plurality of display elements having a rank order associated therewith; display element layout means for placing each of the plurality of display elements such that, according to the rank order associated with the plurality of display elements, the display elements to be displayed farther away from a line which passes through a reference point on a layout plane and is perpendicular to the layout plane, approaching the layout plane disposed in the virtual three dimensional space, are increased in number; and image displaying means for displaying an image illustrating each of the plurality of display elements as a scene viewed from the viewpoint.

Further, still another image display method according to the present invention is an image display method of displaying an image illustrating a scene viewed in line of sight from a viewpoint disposed in a virtual three dimensional space, the image display method including: a display element acquiring step of acquiring a plurality of display elements having a rank order associated therewith; a display element layout step of placing each of the plurality of display elements such that, according to the rank order associated with the plurality of display elements, the display elements to be displayed farther away from a line which passes through a reference point on a layout plane and is perpendicular to the layout plane, approaching the layout plane disposed in the virtual three dimensional space, are increased in number; and an image displaying step of displaying an image illustrating each of the plurality of display elements as a scene viewed from the viewpoint.

Further, still another computer-readable information storage medium according to the present invention stores a program for causing a computer to function as an image display apparatus for displaying an image illustrating a scene viewed in line of sight from a viewpoint disposed in a virtual three dimensional space, the program further causing the computer to function as: display element acquiring means for acquiring a plurality of display elements having a rank order associated therewith; display element layout means for placing each of the plurality of display elements such that, according to the rank order associated with the plurality of display elements, the display elements to be displayed farther away from a line which passes through a reference point on a layout plane and is perpendicular to the layout plane, approaching the layout plane disposed in the virtual three dimensional space, are increased in number; and image displaying means for displaying an image illustrating each of the display elements as a scene viewed from the viewpoint.

According to the present invention, each of the display elements is placed such that, according to the rank order associated with the display elements, the display elements to be displayed farther away from a line which passes through the reference point on the layout plane and is perpendicular to the layout plane are increased in number, which allows the user to recognize the rank of each of the display elements based on a distance to the position at which the display element is placed from the line which passes through the reference point on the layout plane and is perpendicular to the layout plane. In this manner, the plurality of images collectively displayed are presented to the user in such a manner that the rank of each image of the plurality of images may be readily recognized.

According to one aspect of the present invention, the image display apparatus further includes layout region determining means for determining, for each of the plurality of display elements, a layout region having a size corresponding to the rank associated with the display element on the layout plane, the layout region centering on a reference point on the layout plane, and the display element layout means places, for each of the plurality of display elements, the display element at a position based on a position in the layout region determined for the display element by the layout region determining means. With this configuration, the size of the layout region, which serves as a basis of the position at which the display element is placed, is associated with the rank of each image, and hence the plurality of images collectively displayed are presented to the user in such a manner that the rank of each image of the plurality of images may be readily recognized.

In this aspect, the layout region determining means may determine, for each of the plurality of display elements, the layout region which increases in size according to the rank associated with the display element. With this configuration, the size of the layout region, which serves as a basis of the position at which the display element is placed, is associated with the rank of each image such that the layout region is increased in size according to the rank order, and hence the plurality of images collectively displayed are presented to the user in such a manner that the rank of each image of the plurality of images may be readily recognized.

Further, in this aspect, the display element layout means may determine, for each of the plurality of display elements, a position in the layout region based on a random number, and place the display element at a position based on the position thus determined. With this configuration, the position, which serves as a basis of a position at which each display element is placed, is determined at random in the layout region, and hence the plurality of images which are collectively displayed may be placed at various positions.

Further, according to one aspect of the present invention, the display element layout means places each of the plurality of display elements at a position on the layout plane, the position being determined based on a distance from the reference point on the layout plane, the distance corresponding to the rank associated with the display element. With this configuration, the distance from the reference point to the position on the layout plane, the position serving as a basis of the position at which the display element is placed, is associated with the rank of each image, and hence the plurality of images collectively displayed are presented to the user in such a manner that the rank of each image of the plurality of images may be readily recognized.

In this aspect, the display element layout means may place each of the plurality of display elements at a position on the layout plane, the position being determined based on a distance from the reference point on the layout plane, and the distance being increased according to the rank associated with the display element. With this configuration, the distance from the reference point to the position on the layout plane, the position serving as a basis of the position at which the display element is placed, is associated with the rank order of the images such that the distance from the reference point increases according to the rank order, and hence the plurality of images collectively displayed are presented to the user in such a manner that the rank of each image of the plurality of images may be readily recognized.

Further, according to one aspect of the present invention, the display element layout means places each of the plurality of display elements on the layout plane with the display element being rotated at an angle corresponding to the display element. With this configuration, the images may be rotated at various angles when displayed.

DETAILED DESCRIPTION OF THE INVENTION

In the following, an embodiment of the present invention is described in detail with reference to the accompanying drawings.

Figure 1:
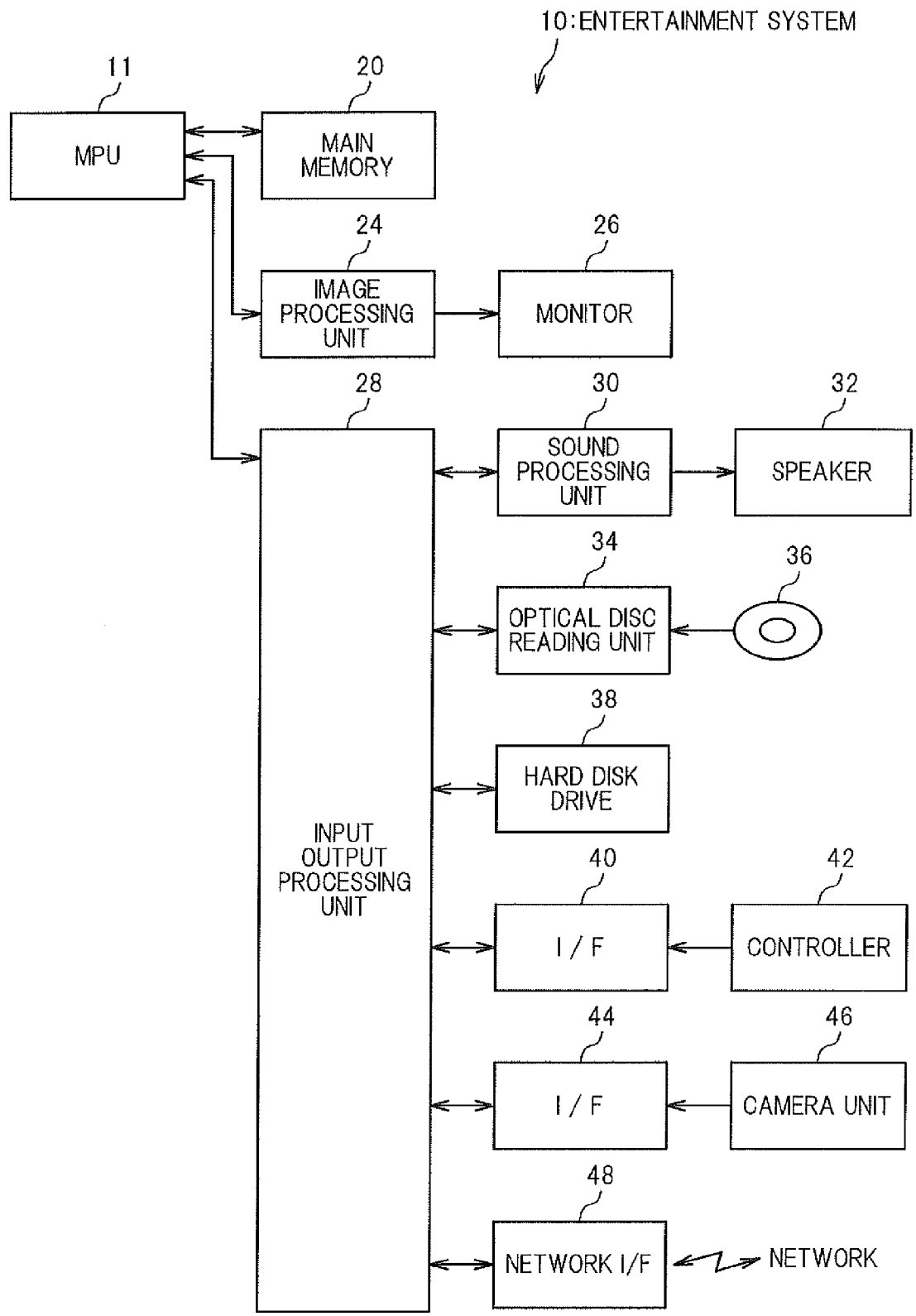
FIG. 1 is a hardware configuration diagram illustrating an example of a hardware configuration of an entertainment system employed as an image display apparatus according to an embodiment of the present invention.

FIG. 1 is a diagram illustrating a hardware configuration of an entertainment system (image display apparatus) 10 according to the embodiment of the present invention. As illustrated in FIG. 1, the entertainment system 10 is a computer system which includes a micro processing unit (MPU) 11, a main memory 20, an image processing unit 24, a monitor 26, an input output processing unit 28, a sound processing unit 30, a speaker 32, an optical disc reading unit 34, an optical disc 36, a hard disk drive 38, interfaces (I/F) 40 and 44, a controller 42, a camera unit 46, and a network interface 48.

Figure 2:
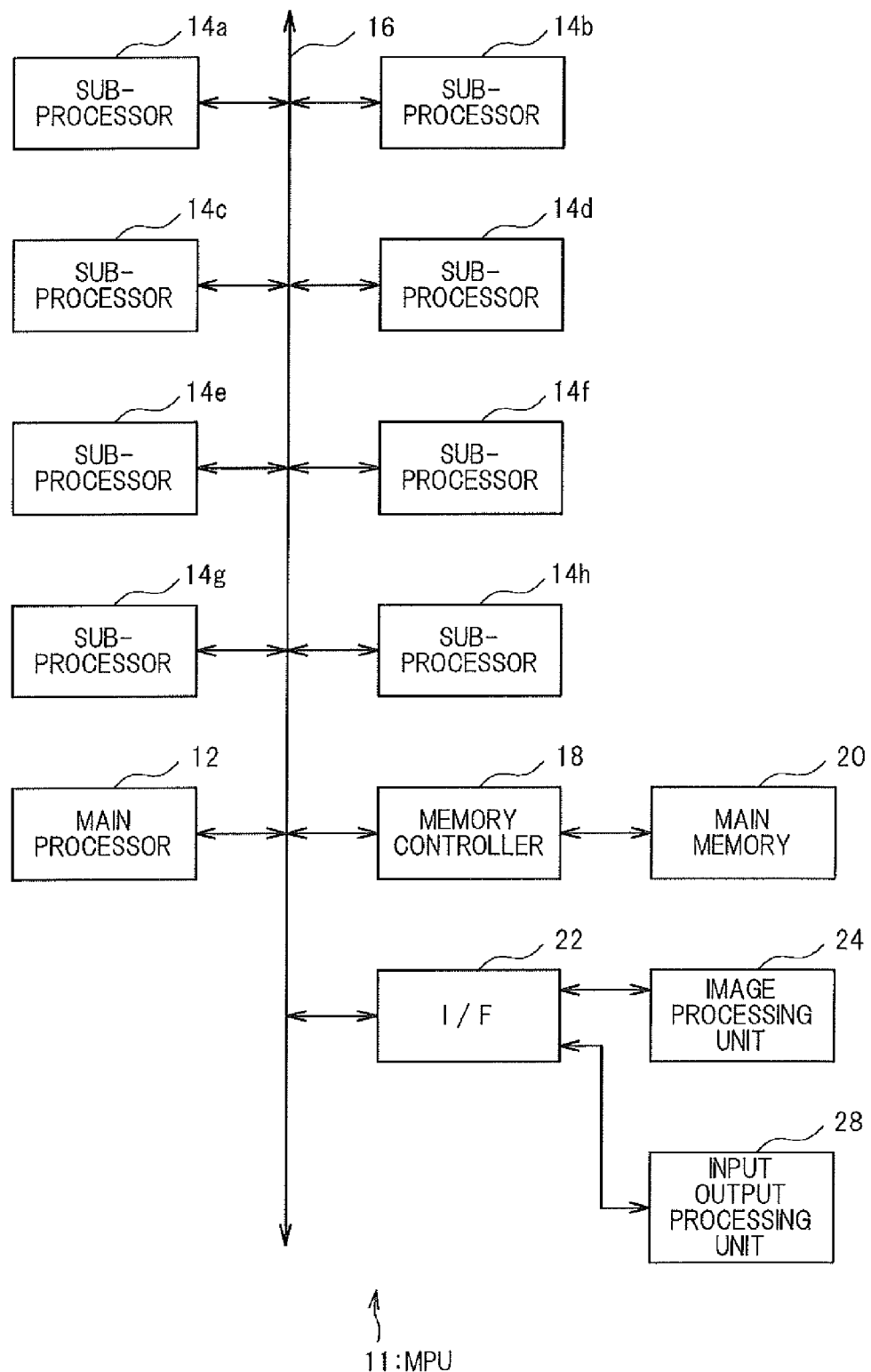
FIG. 2 is a detailed configuration diagram illustrating an example of a micro processing unit (MPU).

FIG. 2 is a diagram illustrating a configuration of the MPU 11. As illustrated in FIG. 2, the MPU 11 includes a main processor 12, sub-processors 14a, 14b, 14c, 14d, 14e, 14f, 14g, and 14h, a bus 16, a memory controller 18, and an interface (I/F) 22.

The main processor 12 carries out various information processing and performs control on the sub-processors 14a to 14h, based on an operating system stored in a read only memory (ROM) (not shown), a program and data read out from the optical disc 36 such as, for example, a digital versatile disk (DVD)-ROM, a program and data supplied via a communication network, and the like.

The sub-processors 14a to 14h carry out various information processing according to an instruction from the main processor 12, and perform control on the respective units of the entertainment system 10, based on a program and data read out from the optical disc 36 such as, for example, a DVD-ROM, a program and data supplied via a communication network, and the like.

The bus 16 is used for exchanging an address and data among the respective units of the entertainment system 10. The main processor 12, the sub-processors 14a to 14h, the memory controller 18, and the interface 22 are mutually connected via the bus 16, so that data may be exchanged therebetween.

The memory controller 18 accesses the main memory 20a according to an instruction from the main processor 12 and the sub-processors 14a to 14h. A program and data read out from the optical disc 36 or the hard disk drive 38 and a program and data supplied via a communication network are written into the main memory 20 as appropriate. The main memory 20 is also used as a working memory of the main processor 12 and the sub-processors 14a to 14h.

The image processing unit 24 and the input output processing unit 28 are connected to the interface 22. The main processor 12 and the sub-processors 14a to 14h exchange data with the image processing unit 24 or with the input output processing unit 28 via the interface 22.

The image processing unit 24 includes a graphical processing unit (GPU) and a frame buffer. The GPU renders various screen images in the frame buffer, base on image data supplied from the main processor 12 or the sub-processors 14a to 14h. The screens formed in the frame buffer are converted into a video signal at a predetermined timing, and output to the monitor 26. It should be noted that the monitor 26 may be implemented as, for example, a television set.

The input output processing unit 28 is connected to the sound processing unit 30, the optical disc reading unit 34, the hard disk drive 38, and the interfaces 40 and 44. The input output processing unit 28 controls the main processor 12 and the sub-processors 14a to 14h to exchange data with the sound processing unit 30, the optical disc reading unit 34, the hard disk drive 38, the interfaces 40, 44, and the network interface 48.

The sound processing unit 30 includes a sound processing unit (SPU) and a sound buffer. The sound buffer stores various kinds of sound data, such as game music, game sound effects, a message, and the like, which are read out from the optical disc 36 or the hard disk drive 38. The SPU reproduces the various kinds of sound data and outputs the reproduced data from the speaker 32. It should be noted that the speaker 32 may be implemented as, for example, a built-in speaker of a television set.

The optical disc reading unit 34 reads a program and data stored in the optical disc 36, according to an instruction from the main processor 12 and the sub-processors 14a to 14h. It should be noted that the entertainment system 10 may be configured capable of reading a program and data stored in any computer-readable information storage medium other than the optical disc 36.

The optical disc 36 includes a general optical disc (computer-readable information storage medium), such as, for example, a DVD-ROM. The hard disk drive 38 is also a general hard disk drive device. The optical disc 36 and the hard disk drive 38 store various programs and data in a computer-readable manner.

The interfaces (I/F) 40 and 44 are used for connecting various peripheral devices, such as the controller 42 and the camera unit 46. Such an interface may be implemented as, for example, a universal serial bus (USB) interface.

The controller 42 serves as general-purpose operation input means for use by a user to input various kinds of operations (for example, game operation). The input output processing unit 28 scans the states of the respective units of the controller 42 every predetermined period of time (for example, 1/60th of a second), and supplies the result as operational states to the main processor 12 or the sub-processors 14a to 14h. The main processor 12 or the sub-processors 14a to 14h determine the contents of an operation performed by the user, based on the operational states. It should be noted that the entertainment system 10 is configured capable of connecting to a plurality of controllers 42, and the main processor 12 and the sub-processors 14a to 14h carry out various kinds of processing based on the operational states input from the respective controllers 42.

The camera unit 46 includes, for example, a publicly-known digital camera, and inputs a captured image of black/white, gray-scale, or color, every predetermined period of time (for example, 1/60th of a second). The camera unit 46 according to this embodiment inputs the captured image as image data in the joint photographic experts group (JPEG) format. The camera unit 46 is placed on the monitor 26, in a state where, for example, the lens thereof is directed to the user, and connected to the interface 44 via a cable. The network interface 48 is connected to the input output processing unit 28 and a network, so as to relay data communication carried out by the entertainment system 10 via the network with another entertainment system 10.

Figure 3A:
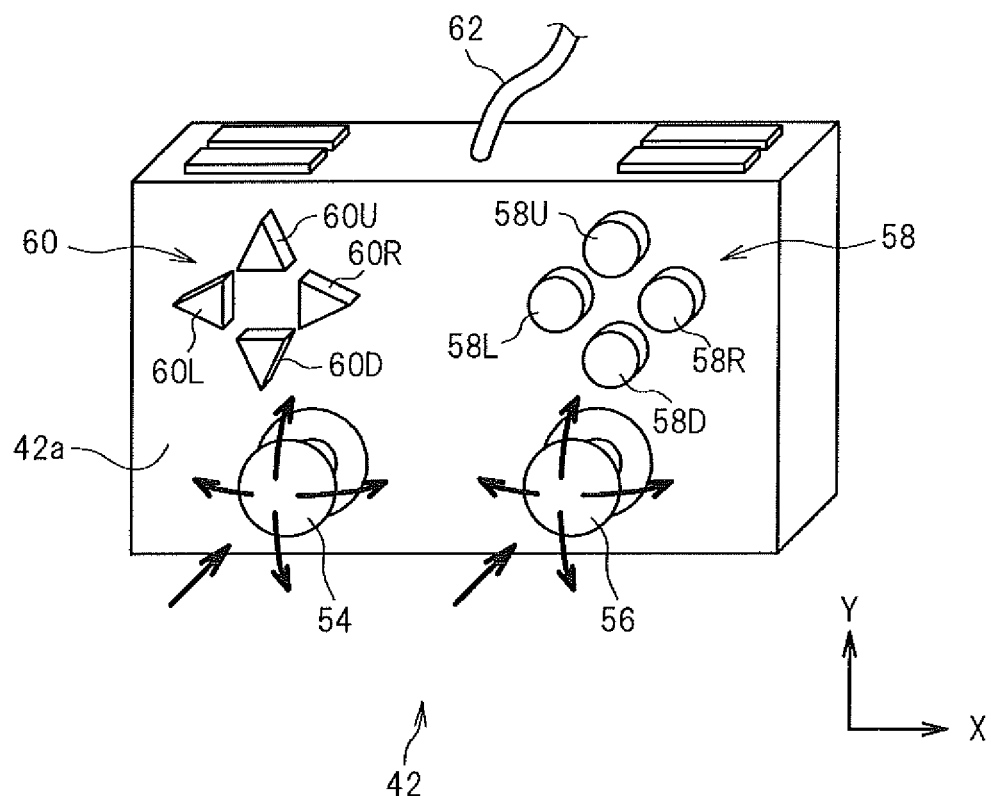
FIG. 3A is a perspective view illustrating an example of a controller.
Figure 3B:
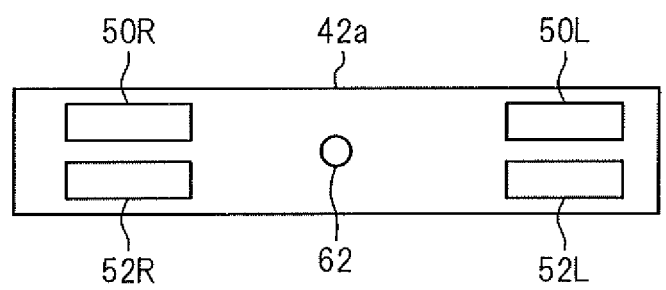
FIG. 3B is an upper side view illustrating an example of the controller.

FIG. 3A is a perspective view illustrating an example of the controller 42. FIG. 3B is an upper side view illustrating an example of the controller 42. As illustrated in FIG. 3A, the controller 42 is connected to the entertainment system 10 via a controller cable 62, and is provided with a direction button group 60 (including a leftward-direction button 60L, a rightward-direction button 60R, an upward-direction button 60U, and a downward direction button 60D) and a left operation stick 54 on the left side of a front surface 42a, and a button group 58 (including a left button 58L, a right button 58R, an upper button 58U, and a lower button 58D) and a right operation stick 56 on the right side of the front surface 42a. Further, as illustrated in FIG. 3B, on a depth side surface of the controller 42, there are provided a first left button 50L and a first right button 50R left and right on the front surface 42a side, and a second left button 52L and a second right button 52R left and right on the rear surface side. When the user holds the right and left of a housing of the controller 42 with both hands, the left thumb comes to the direction button group 60 and the left operation stick 54 and the right thumb comes to the button group 58 and the right operation stick 56. At least one of the right index finger and the right middle finger comes to one of the first right button 50R and the second right button 52R, and at least one of the left index finger and the left middle finger comes to one of the first left button 50L and the second left button 52L.

The direction button group 60, the button group 58, the first left button 50L, the first right button 50R, the second left button 52L, the second right button 52R are each formed of a pressure-sensitive button, which is provided with a pressure sensor. When the user depresses those buttons, a digital value of one of 256 stages on a scale of 0 to 255 (256 stages) is input to the entertainment system 10 according to the depressing force. Specifically, in the entertainment system 10, the digital value is used to determine that, for example, when a digital value of 0 is input from the controller 42, the corresponding button is not depressed, whereas when a digital value of 255 is input, the corresponding button is depressed with a maximum depressing force.

The left operation stick 54 and the right operation stick 56 are each operating members shaped like a stick, which stand upright on a surface of the housing of the controller 42, and are capable of being tilted in all directions at a predetermined angle from the upright state. As illustrated in FIG. 3A, the longitudinal direction of the housing of the controller 42 is defined as an X-axis direction (rightward direction in FIG. 3A is set as a positive direction), and the depth direction of the housing, the direction being orthogonal to the X-axis direction, is defined as an Y-axis direction (direction extending from the front to the back in FIG. 3A is set as a positive direction). The posture (operating state) of the left operation stick 54 is represented by tilts in the X-axis direction and the Y-axis direction (posture data (X, Y)), and the tilts are each input as a digital value on a scale of 0 to 255 to the entertainment system 10. Specifically, when X has a value equal to or close to 127, 128, or the like, it is indicated that the left operation stick 54 is not tilted in the X-axis direction. Alternatively, when X=255, it is indicated that the left operation stick 54 is tilted to the maximum in the positive direction of the X-axis (rightward direction in FIG. 3A). Further, when X=0, it is indicated that the left operation stick 54 is tilted to the maximum in the negative direction of the X-axis (leftward direction in FIG. 3A). The same applies to the Y-axis direction. Further, the right operation stick 56 may be operated similarly as in the case of the left operation stick 54. In this manner, the entertainment system 10 is capable of identifying a current state (posture) of tilt of each of the left operation stick 54 and the right operation stick 56. Further, the left operation stick 54 and the right operation stick 56 are each also formed of a pressure-sensitive button similar to those forming the direction button group 60, the button group 58, and the like, and may be depressed in the shaft direction of the stick.

Further, the controller 42 includes an embedded oscillator (vibrator). The vibrator vibrates by instruction of the MPU 11.

In the following, a description is given of the embodiment of the present invention in which the entertainment system 10 with the above-mentioned hardware configuration is implemented as an image display apparatus.

First, an outline of this embodiment is described.

Figure 4:
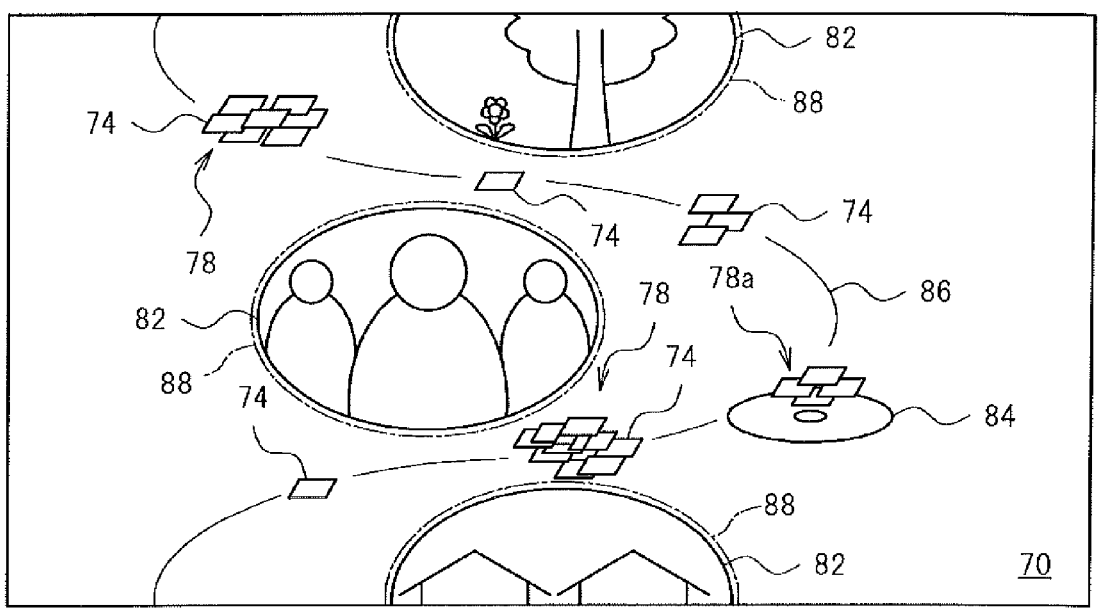
FIG. 4 illustrates an example of a library view screen according to the embodiment.

FIG. 4 illustrates an example of a library view screen 70, which is an example of a screen to be displayed on the monitor 26 of the entertainment system 10 operating as an image display apparatus. The library view screen 70 illustrated in FIG. 4 is rendered by visualizing a virtual three dimensional space (for example, a library view space 72 illustrated in FIG. 5 in this embodiment). Specifically, for example, the library view space 72 having a large number of photo image objects 74 laid out thereon, the photo image objects 74 each being a virtual three dimensional model depicting an L-size photograph with white border, is rendered as a real time image generated by known three dimensional computer graphics technology based on a scene viewed from the viewpoint 76 in the space, to thereby generate the library view screen 70.

Figure 5:
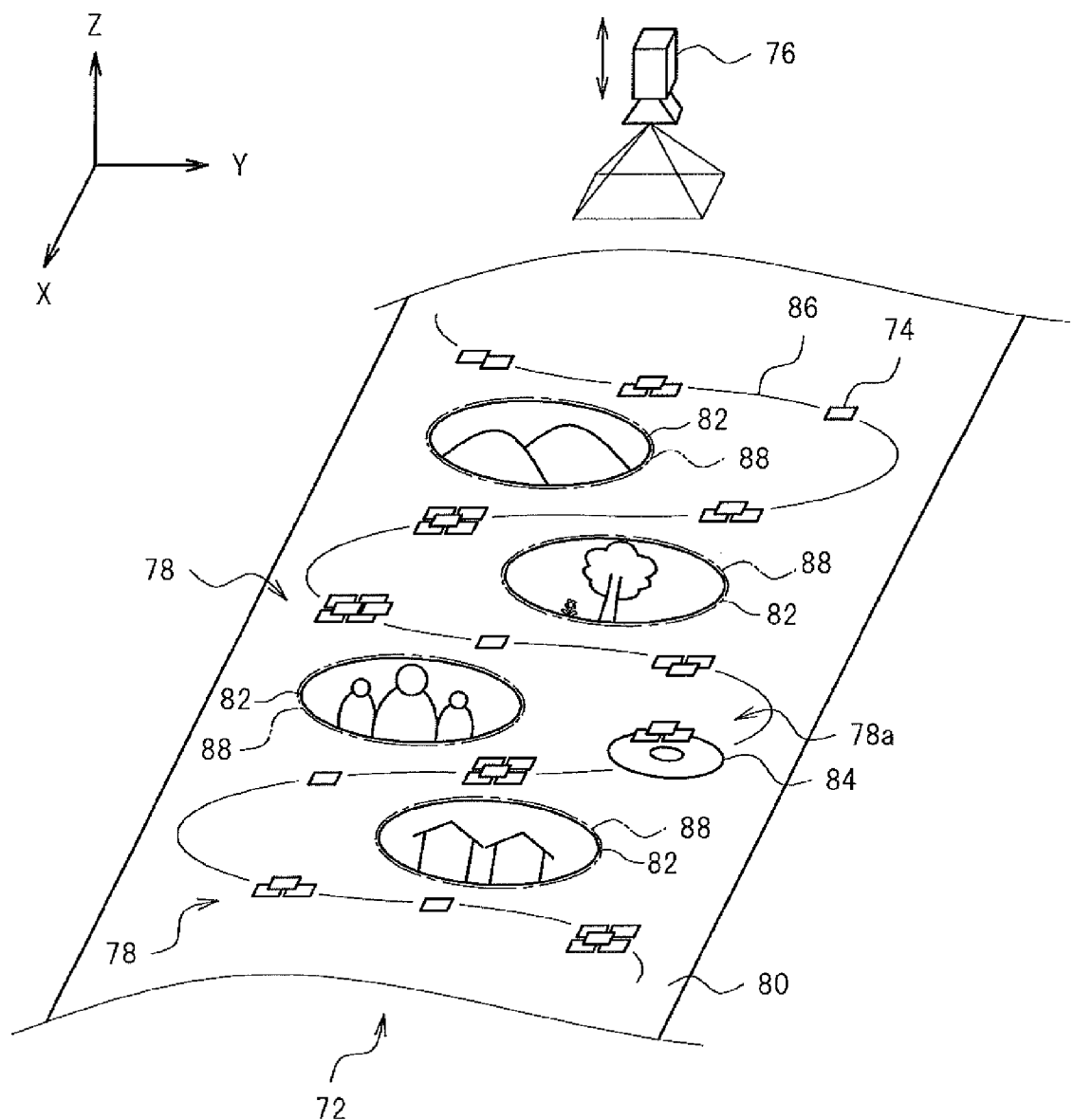
FIG. 5 is a perspective view illustrating an example of an entire picture of the library view space according to the embodiment.

FIG. 5 is a perspective view illustrating an example of an overview of the library view space 72. As illustrated in FIG. 5, in the library view space 72, a group image object 78 including one or a plurality of photo image objects 74 is placed on a layout plane object 80 disposed in the virtual three dimensional space. As illustrated in the drawing, the photo image objects 74 are arranged in groups. Each three dimensional model is formed of a polygon, and each of the photo image objects 74 has a photo image mapped thereto as a texture. The photo image may include a photo image which is, for example, captured by using a digital camera or acquired via the Internet, and possessed by a user. In addition, photo images with a common attribute, for example, with the same shooting date, are mapped as textures to one or a plurality of photo image objects 74 forming each group image object 78. It should be noted that there may be displayed, in the vicinity of the group image object 78, a character string for describing the above-mentioned common attribute.

It should be noted that the above-mentioned common attribute may include an attribute indicating the type of the subject, such as "a photo which may include an image of a child" or "a photo which may include an image of an adult", or may include an attribute indicating the color of the photo, such as "a bluish photo" or "a reddish photo".

Then, the library view screen 70 has a plurality of elliptically-shaped representative image objects 82 laid out thereon. The representative image objects 82 each display an image corresponding to any one of the photo images mapped to the photo image objects 74 forming the group image object 78 in the vicinity of the representative image objects 82. The displayed image is larger than each of the photo image objects 74 forming the group image object 78.

According to this embodiment, a photo image to be mapped to the representative image object 82 is switched at predetermined time intervals.

It should be noted that the outline of the representative image object 82 may be smoothed (that is, feathered). Further, in this embodiment, a photo image to be mapped to the representative image object 82 is trimmed along the outline of the representative image object 82.

The library view space 72 further has a library view cursor image object 84 arranged thereon. The library view cursor image object 84 renders a closed circular region. The library view cursor image object 84 translucently glows in the center thereof when displayed on the library view screen 70. In this manner, the user may identify the center of the library view cursor image object 84. In the examples of FIGS. 4 and 5, the library view cursor image object 84 designates one group image object 78 (selected group image object 78*a*).

The library view space 72 illustrated in FIG. 5 is virtually constructed in the main memory 20 of the entertainment system 10. On the layout plane object 80, which is shaped like a vast flat plate, the group image objects 78 are laid out at substantially equal intervals along a group image object layout reference line 86. Then, a plurality of representative image layout regions 88 are provided in regions different from the regions where the group image objects 78 are laid out. Each of the representative image layout regions 88 has the representative image object 82 placed thereon. Any one of the photo images mapped to the photo image objects 74 forming the group image object 78 in the vicinity of the representative image layout region 88 is mapped to the representative image object 82 on the representative image layout region 88.

Then, a viewpoint 76 is disposed above the layout plane object 80. In the entertainment system 10 according to this embodiment, an image depicting a scene viewed from the viewpoint 76 in the line of sight is generated in real time, that is, every predetermined period of time (for example, ¹⁄₆₀th of a second), and the image thus generated is displayed on the monitor 26.

The library view cursor image object 84 moves when the user operates the controller 42 in a state where the library view screen 70 is displayed on the monitor 26.

Alternatively, in a state where the library view screen 70 is displayed on the monitor 26, when the user operates the controller 42, the viewpoint 76 moves toward (zooms in) or away from (zooms out) the layout plane object 80. In other words, the user is capable of changing the size of a region (display region) on the layout plane object 80 displayed on the monitor 26.

Figure 6A:
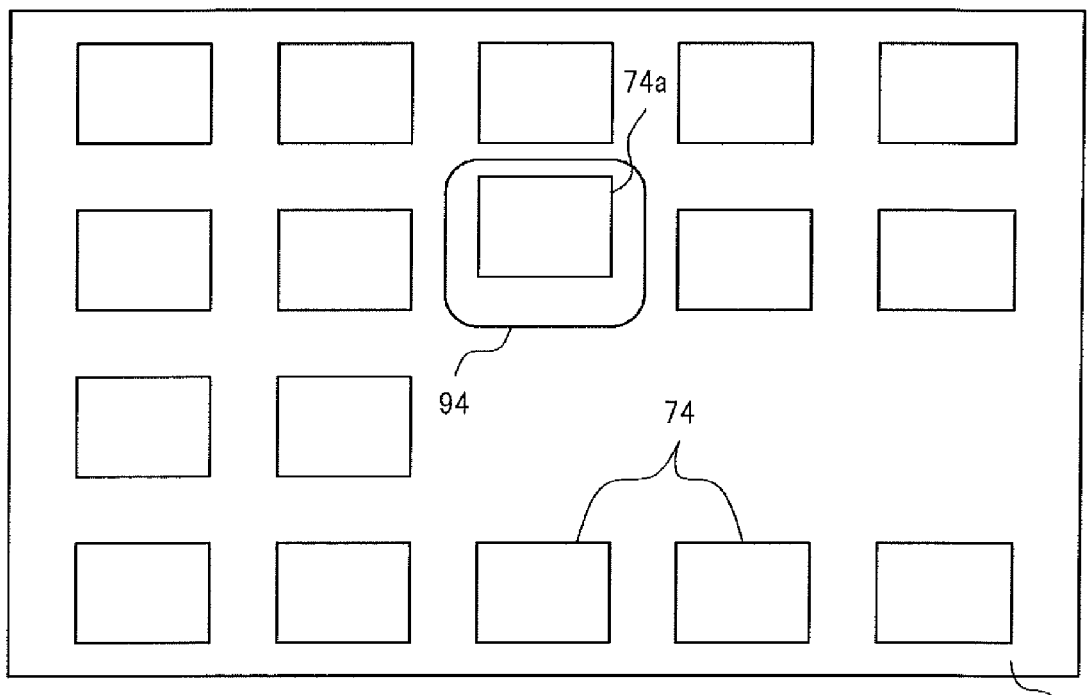
FIG. 6A illustrates an example of a tile view screen according to the embodiment.
Figure 6B:
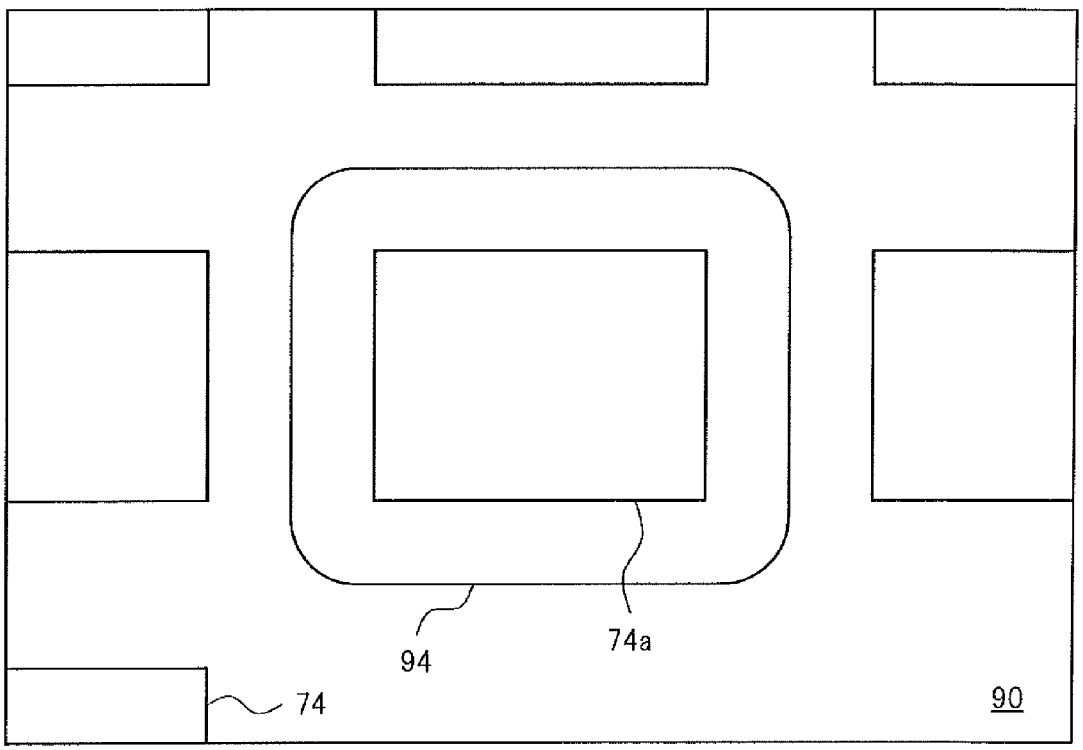
FIG. 6B illustrates another example of the tile view screen according to the embodiment.
Figure 7:
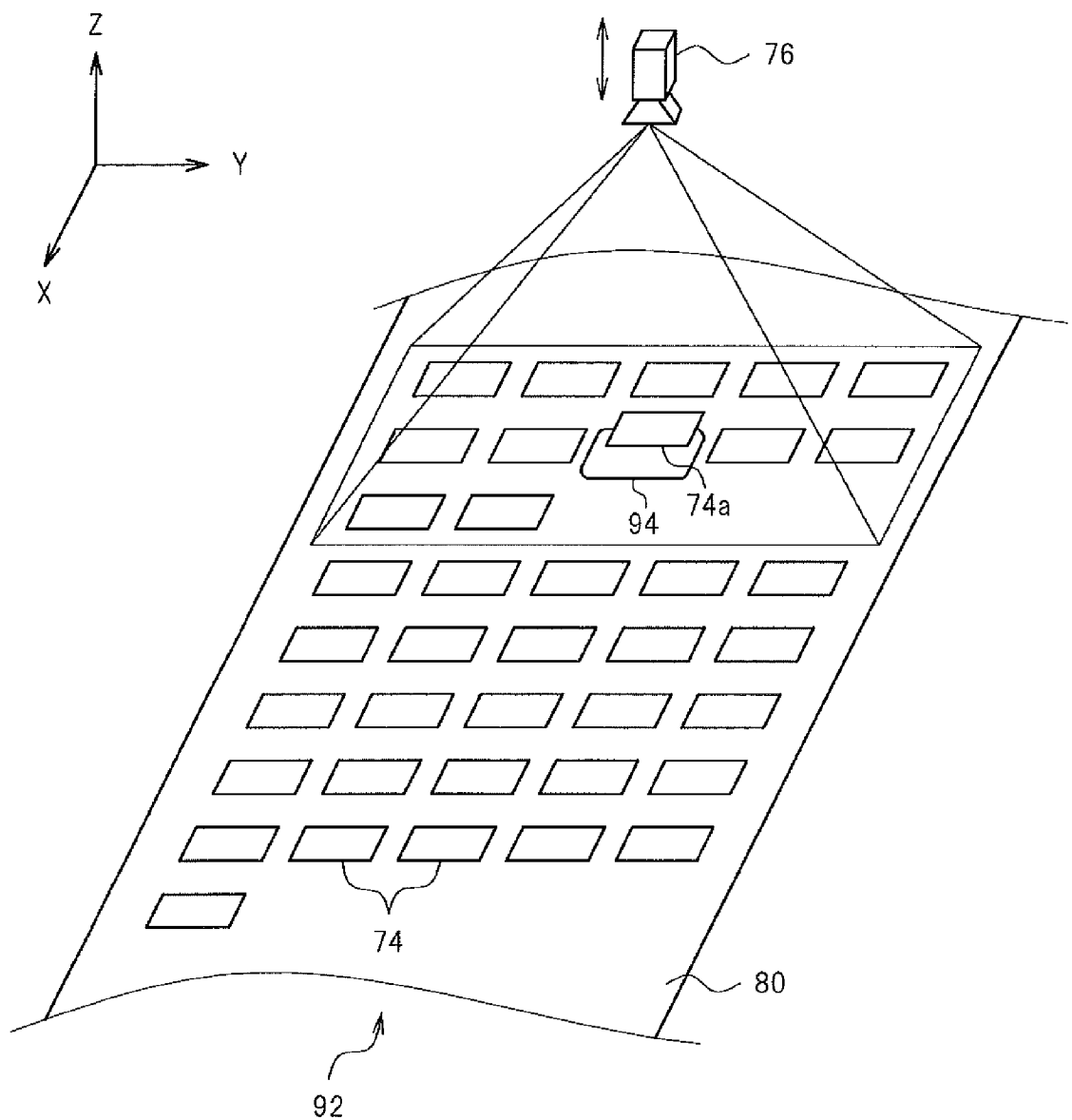
FIG. 7 is a perspective view illustrating an example of an entire picture of a tile view space according to the embodiment.

FIGS. 6A and 6B each illustrate an example of a tile view screen 90, which is another example of a screen to be displayed on the monitor 26 of the entertainment system 10 operating as an image display apparatus. The tile view screen 90 illustrated in each of FIGS. 6A and 6B is rendered, similarly to the library view screen 70, by visualizing a virtual three dimensional space (for example, a tile view space 92 illustrated in FIG. 7 in this embodiment). Specifically, for example, the tile view space 92 having a large number of photo image objects 74 laid out thereon, the photo image objects 74 each being a virtual three dimensional model depicting an L-size photograph with a white border, is rendered as a real time image generated by known three dimensional computer graphics technology based on a scene viewed from the viewpoint 76 in the same space, to thereby generate the tile view screen 90. FIG. 7 is a perspective view illustrating an example of an entire picture of the tile view space 92. As illustrated in FIGS. 6A, 6B, and 7, in the tile view space 92, the photo image objects 74 are divided into groups corresponding to the above-mentioned group image object 78, and aligned for each group to be laid out on the layout plane object, 80. As described above, photo images with a common attribute are mapped as textures to the photo image objects 74 forming each group. It should be noted that there may be displayed, in the vicinity of each group, a character string for describing the above-mentioned common attribute or the number of photo images belonging to the group.

Then, a tile view cursor image object 94 is placed between one of the photo image objects 74 (selected photo image object 74*a*) and the layout plane object 80. In this embodiment, the tile view cursor image object 94 is, for example, a rectangular translucent image with round corners. Further, in this embodiment, the selected photo image object 74*a* designated by the tile view cursor image object 94 is placed spaced apart from the layout plane object 80.

The tile view space 92 illustrated in FIG. 7 is virtually constructed on the main memory 20 of the entertainment system 10. On the layout plane object 80, which is shaped like a vast flat plate, the photo image objects 74 are laid out for each group, aligned with a space therebetween. The viewpoint 76 is disposed above the layout plane object 80. In the entertainment system 10 according to this embodiment, an image depicting a scene viewed from the viewpoint 76 in the line of sight is generated in real time, that is, every predetermined period of time (for example, ¹⁄₆₀th of a second), and the image thus generated is displayed on the monitor 26.

The tile view cursor image object 94 moves when the user operates the controller 42 in a state where the tile view screen 90 is displayed on the monitor 26.

Alternatively, in a state where the tile view screen 90 is displayed on the monitor 26, when the user operates the controller 42, the viewpoint 76 moves toward (zooms in) or away from (zooms out) the layout plane object 80. In other words, the user is capable of changing the size of a region (display region) on the layout plane object 80 displayed on the monitor 26. Specifically, for example, when the user performs a zoom-in operation in a state where the tile view screen 90 illustrated in FIG. 6A is displayed on the monitor 26, the tile view screen 90 illustrated in FIG. 6B is displayed on the monitor 26.

It should be noted that a screen to be displayed on the monitor 26 is not limited to the screen described above. Specifically, for example, there may be generated an image depicting a play list space (not shown), on which favorite photo image objects 74 are laid out, as a scene viewed from a position of the viewpoint 76, and the image thus generated may be displayed on the monitor 26 as a play list screen (not shown).

Next, a function to be implemented by the entertainment system 10 according to this embodiment is described. FIGS. 8A, 8B, 8C, and 8D constitute a functional block diagram illustrating an example of the function implemented by the entertainment system 10 according to this embodiment.

Figure 8A:
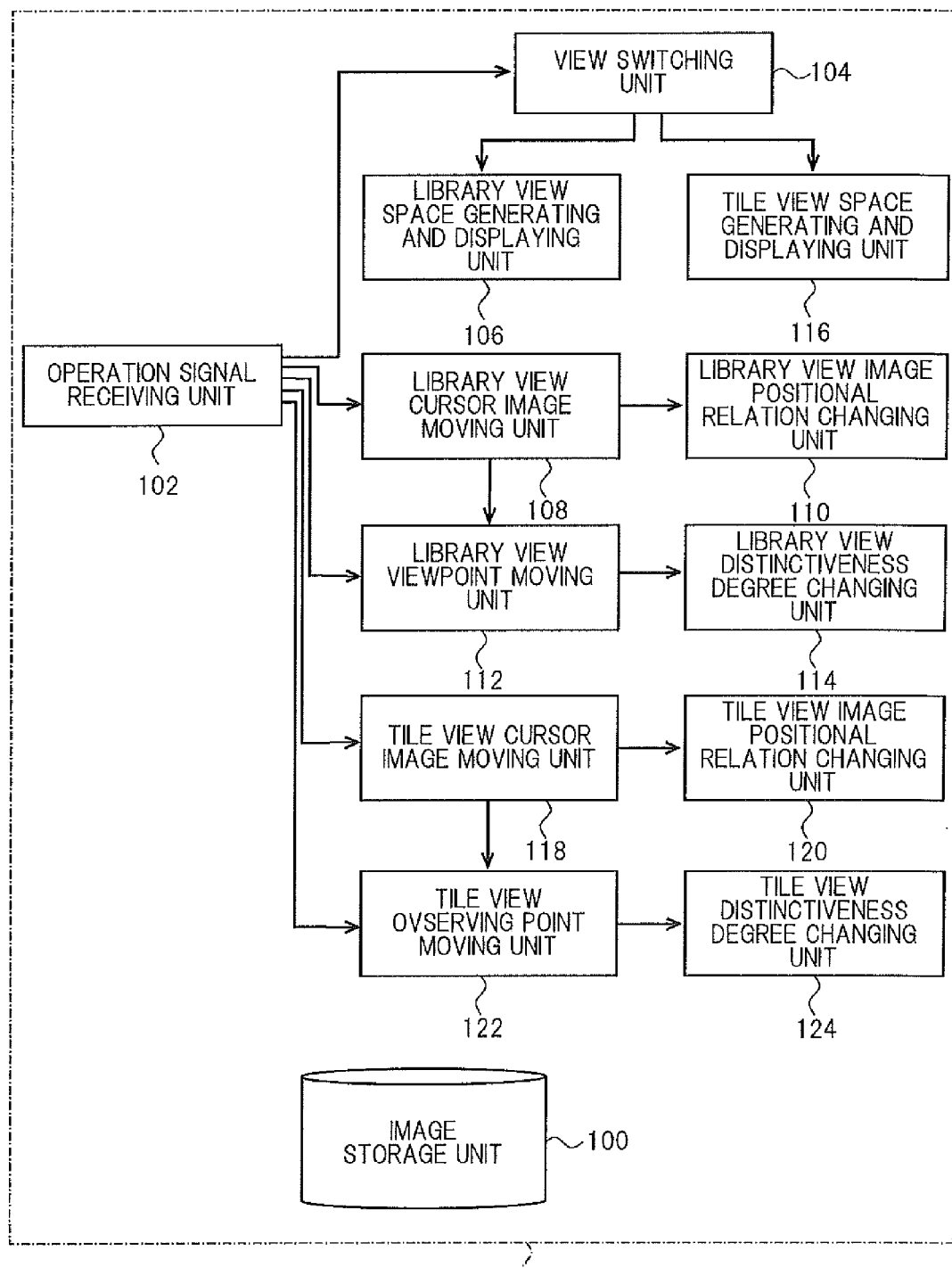
FIG. 8A is a functional block diagram illustrating an example of a function of the image display apparatus according to the embodiment of the present invention.

As illustrated in FIG. 8A, the entertainment system 10 according to this embodiment includes, in terms of function: an image storage unit 100; an operation signal receiving unit 102; a view switching unit 104; a library view space generating and displaying unit 106; a library view cursor image moving unit 108; a library view image positional relation changing unit 110; a library view viewpoint moving unit 112; a library view distinctiveness degree changing unit 114; a tile view space generating and displaying unit 116; a tile view cursor image moving unit 118; a tile view image positional relation changing unit 120; a tile view viewpoint moving unit 122; and a tile view distinctiveness degree changing unit 124, and functions as such. It should be noted that the entertainment system 10 may not necessarily include all the elements. Further, of those elements, the image storage unit 100 is implemented mainly by a storage device, such as the main memory 20 or the hard disk drive 38, provided to the entertainment system 10. The operation signal receiving unit 102, the view switching unit 104, the library view space generating and displaying unit 106, the library view cursor image moving unit 108, the library view image positional relation changing unit 110, the library view viewpoint moving unit 112, the library view distinctiveness degree changing unit 114, the tile view space generating and displaying unit 116, the tile view cursor image moving unit 118, the tile view image positional relation changing unit 120, the tile view viewpoint moving unit 122, and the tile view distinctiveness degree changing unit 124 are each implemented by a control device such as the MPU 11 provided to the entertainment system 10.

Figure 8B:
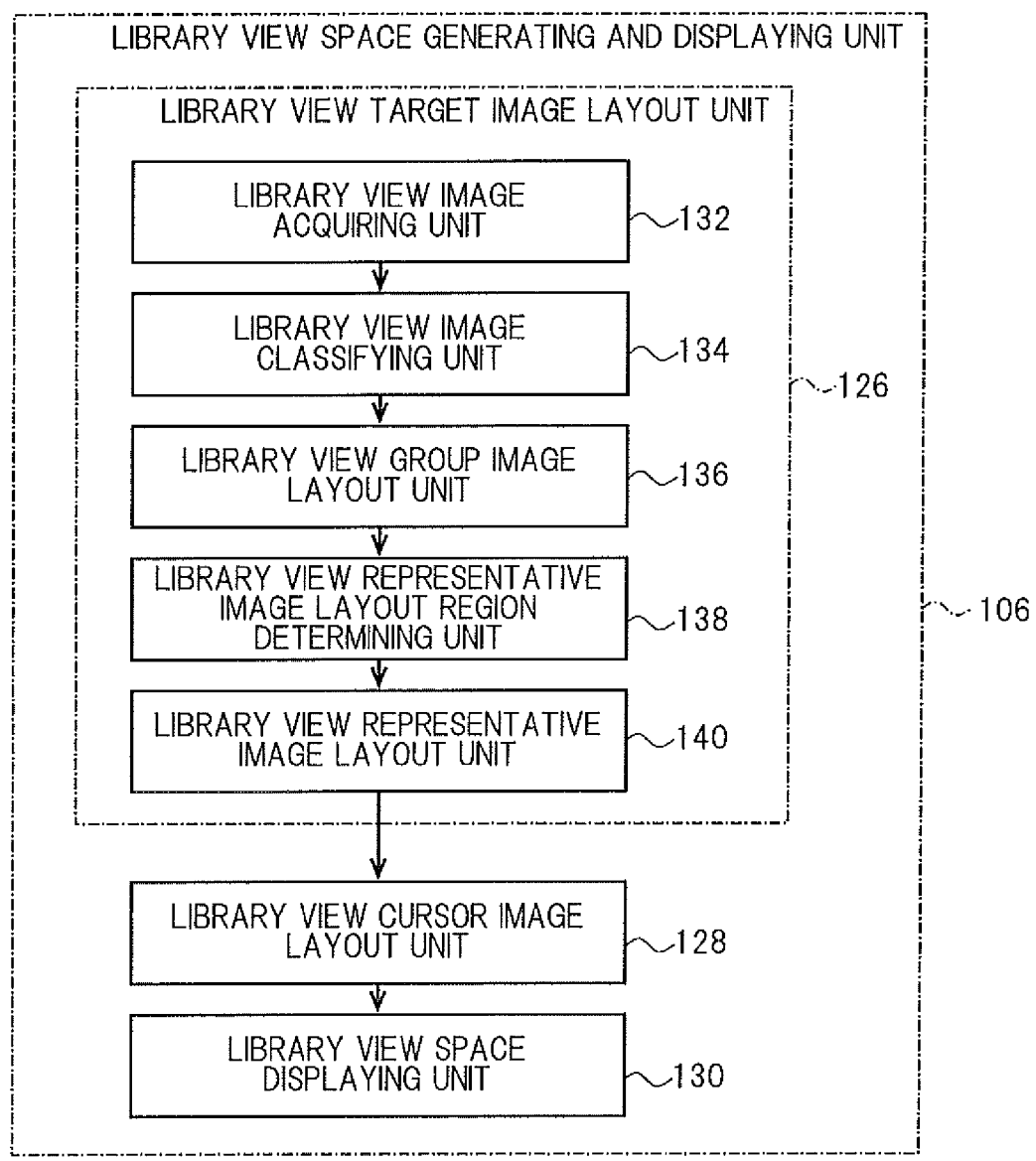
FIG. 8B is a functional block diagram illustrating the example of a function of the image display apparatus according to the embodiment of the present invention.

Then, as illustrated in FIG. 8B, the library view space generating and displaying unit 106 includes a library view target image layout unit 126, a library view cursor image layout unit 128, and a library view space displaying unit 130. The library view target image layout unit 126 includes a library view image acquiring unit 132, a library view image classifying unit 134, a library view group image layout unit 136, a library view representative image layout region determining, unit 138, and a library view representative image layout unit 140.

Figure 8C:
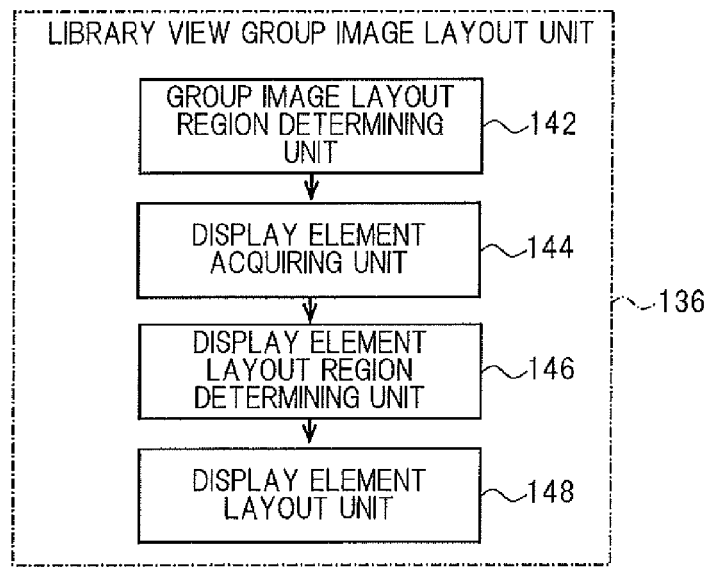
FIG. 8C is a functional block diagram illustrating the example of a function of the image display apparatus according to the embodiment of the present invention.

Further, as illustrated in FIG. 8C, the library view group image layout unit 136 includes a group image layout region determining unit 142, a display element acquiring unit 144, a display element layout region determining unit 146, and a display element layout unit 148.

Figure 8D:
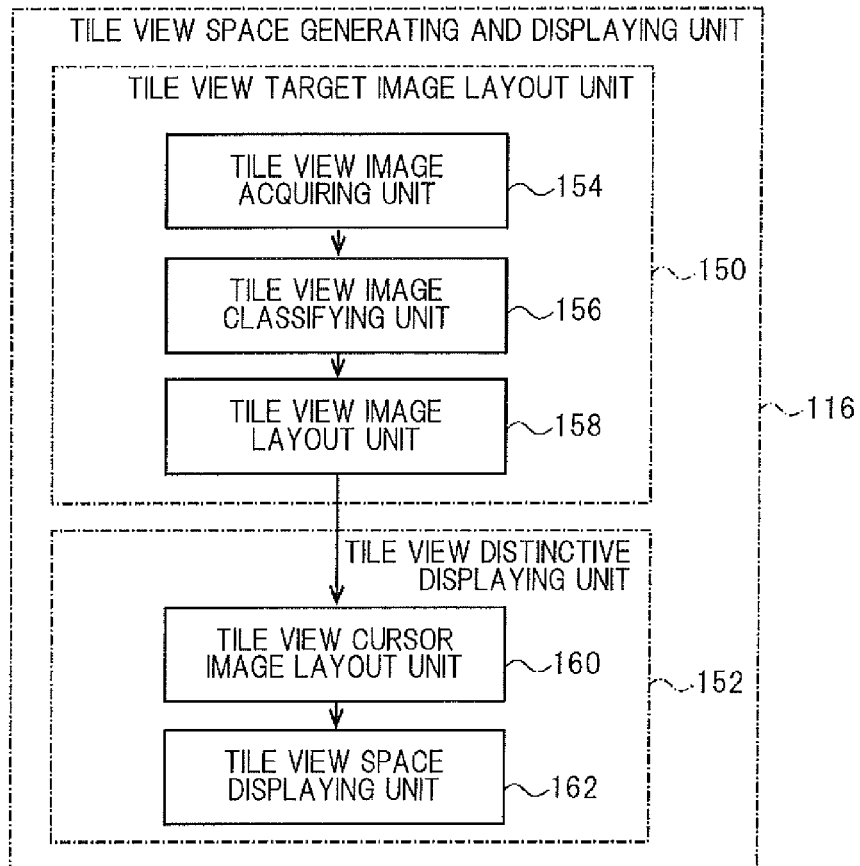
FIG. 8D is a functional block diagram illustrating the example of a function of the image display apparatus according to the embodiment of the present invention.

Further, as illustrated in FIG. 8D, the tile view space generating and displaying unit 116 includes a tile view target image layout unit 150 and a tile view distinctive displaying unit 152. The tile view target image layout unit 150 includes a tile view image acquiring unit 154, a tile view image classifying unit 156, and a tile view image layout unit 158. The tile view distinctive displaying unit 152 includes a tile view cursor image layout unit 160 and a tile view space displaying unit 162.

Those elements are implemented by executing programs installed in the entertainment system 10, which is a computer, by a control device such as the MPU 11 provided to the entertainment system 10. It should be noted that the programs may be supplied to the entertainment system 10, for example, via an information transmitting medium such as a CD-ROM or a DVD-ROM, or via a communication network such as the Internet.

The image storage unit 100 stores still images captured by the user using a digital camera or still images downloaded from a site on the Internet via the network interface 48. In this embodiment, the image storage unit 100 stores, for example, photo images. Photo images captured by using a digital camera are read out directly from the digital camera or from a portable storage medium detached from the digital camera, via an interface (not shown) connected to the input output processing unit 28 of the entertainment system 10. Further, the image storage unit 100 also stores attribute information on each image regarding the image size, the shooting date and time, a comment, the color, and the type of the subject. It should be noted that the image storage unit 100 may store the photo image objects 74 to which the photo images are mapped as textures.

The operation signal receiving unit 102 receives an operation signal corresponding to an operation performed on the controller 42 by the user. Specifically, the operation signal receiving unit 102 receives, for example, a digital value indicating a tilt of the left operation stick 54 or the right operation stick 56, or a digital value indicating a depressing force applied to the button group 58 or to the direction button group 60, from the controller 42.

The view switching unit 104 switches a view displayed on the monitor 26 when an operation signal (for example, an operation signal indicating that a predetermined button included in the button group 58 is depressed) is received by the operation signal receiving unit 102. Specifically, for example, in a state where the library view screen 70 is displayed on the monitor 26, when the operation signal receiving unit 102 has received an operation signal indicating that the right button 58R is depressed, the view switching unit 104 causes the tile view space generating and displaying unit 116 to generate the tile view space 92. Alternatively, for example, in a state where the tile view screen 90 is displayed on the monitor 26, when the operation signal receiving unit 102 has received an operation signal indicating that the lower button 58D is depressed, the view switching unit 104 causes the library view space generating and displaying unit 106 to generate the library view space 72.

The library view space generating and displaying unit 106 generates the library view space 72. Then, the library view space generating and displaying unit 106 displays the library view screen 70 on the monitor 26. As described above, in this embodiment, the library view space generating and displaying unit 106 includes the library view target image layout unit 126, the library view cursor image layout unit 128, and the library view space displaying unit 130.

The library view target image layout unit 126 places at least one target image (for example, the representative image object 82 or the group image object 78) on the layout plane object 80 in the library view space 72. As described above, in this embodiment, the library view target image layout unit 126 includes the library view image acquiring unit 132, the library view image classifying unit 134, the library view group image layout unit 136, the library view representative image layout region determining unit 138, and the library view representative image layout unit 140.

The library view image acquiring unit 132 acquires a plurality of images (for example, photo images) stored in the image storage unit 100.

The library view image classifying unit 134 classifies the plurality of images acquired by the library view image acquiring unit 132, into one or a plurality of groups which have a rank order associated therewith. In this embodiment, specifically, the library view image classifying unit 134 classifies the plurality of photo images into one, or a plurality of groups which have a rank order associated therewith, based on the attribute (for example, shooting date) associated with each of the photo images. It should be noted that the library view image classifying unit 134 may classify the photo images based on any other attribute (for example, the color or the type of the subject) rather than the shooting date.

The library view group image layout unit 136 lays out group images associated with each group (in this embodiment, the group image objects 78), along a group image layout reference line (in this embodiment, the group image object layout reference line 86) provided on a display region displayed on the monitor 26 (for example, the layout plane object 80), according to the rank of each group.

Here, a description is given of an example of processing performed by the library view group image layout unit 136 for laying out the group image objects 78. In the process of laying out the group image objects 78, a group image layout region determining process is first performed, and then a display element layout process is performed.

Figure 9:
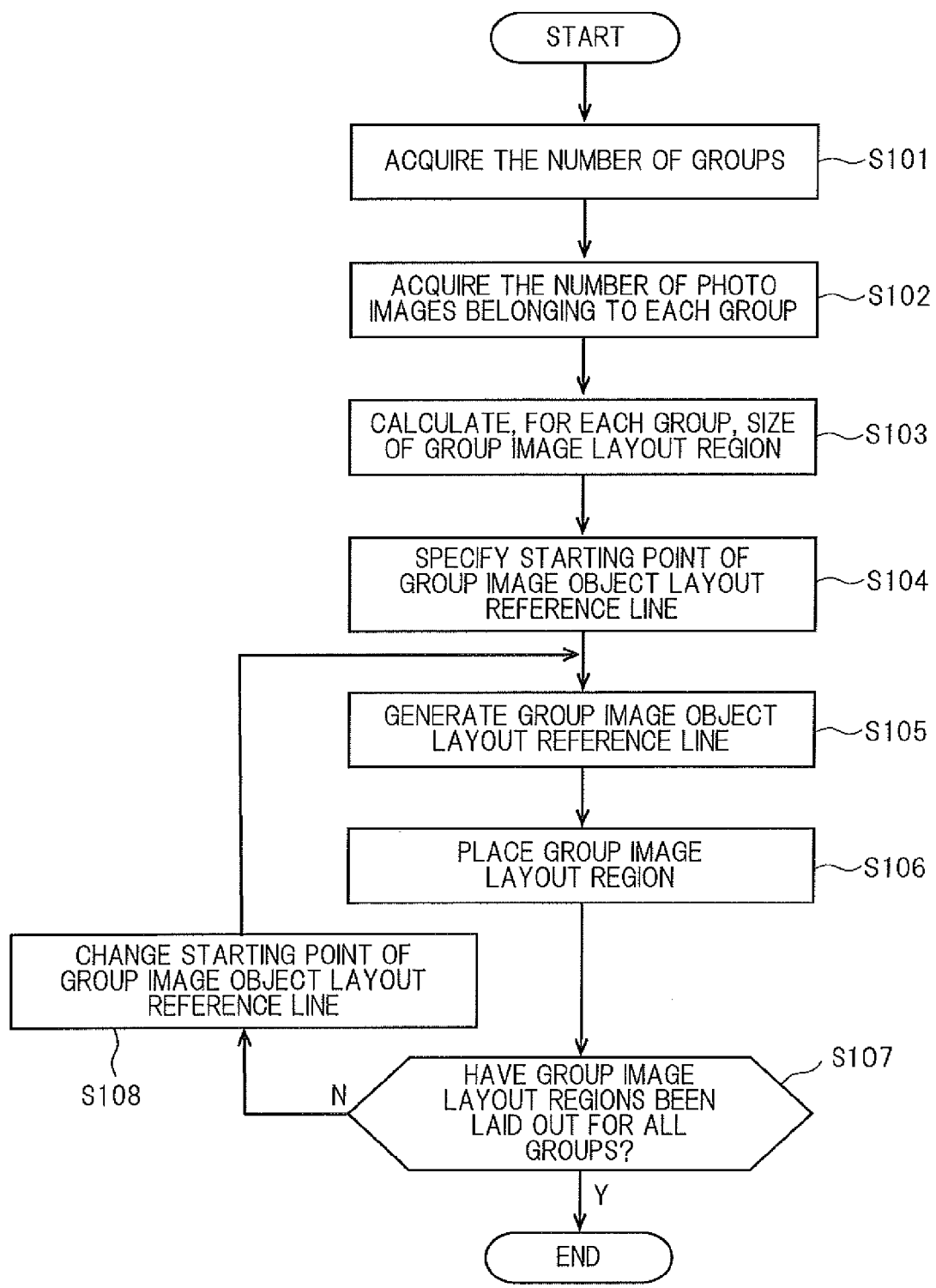
FIG. 9 is a flow chart illustrating an example of a process flow performed by the image display apparatus according to the embodiment.

Now, an example of a flow of the group image layout region determining process is first described with reference to the flow chart illustrated in FIG. 9.

First, the group image layout region determining unit 142 acquires the number of groups into which the images are classified by the library view image classifying unit 134 (S101). Then, the group image layout region determining unit 142 acquires, for each group, the number of photo images belonging to the group (S102). The group image layout region determining unit 142 then calculates, for each group, a size of a group image layout region 166 (see FIG. 11) according to the number of photo images belonging to the group (S103). Data that shows a relation between the number of photo images acquired in the process illustrated in S102 and the size of the group image layout region 166 calculated in the process illustrated in S103, may be stored in advance in a storage device, such as, for example, the main memory 20 or the hard disk drive 38. Then, in the process illustrated in S103, the group image layout region determining unit 142 may acquire the data.

Then, the group image layout region determining unit 142 specifies a given point on the layout plane object 80, as a starting point 164 of the group image object layout reference line 86 (S104). The group image layout region determining unit 142 specifies a position of the starting point 164 of the group image object layout reference line 86 such that, for example, the group image object layout reference line 86 accounts for 70% in width of the width of the layout plane object 80 serving as a display region in a case where the layout plane object 80 is displayed on the monitor 26 in a maximum range.

Figure 10:
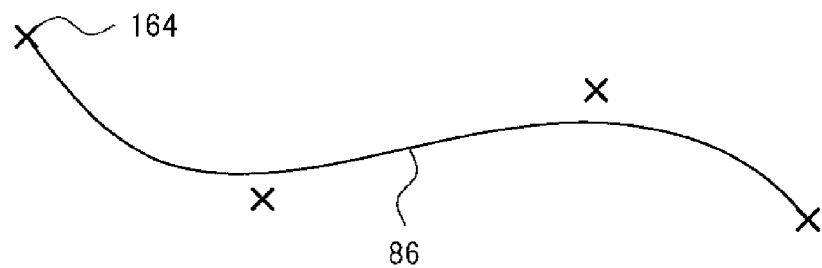
FIG. 10 illustrates an example of a group image object layout reference line.

Then, the group image layout region determining unit 142 generates, from the position of the starting point 164, the group image object layout reference line 86, which is, for example, a Bezier curve with a tilt in a given range, on the layout plane object 80 (S105). The group image layout region determining unit 142 defines the Bezier curve serving as the group image object layout reference line 86, based on, for example, positions of four points including the starting point 164. An example of the group image object layout reference line 86 thus generated is illustrated in FIG. 10.

Figure 11:
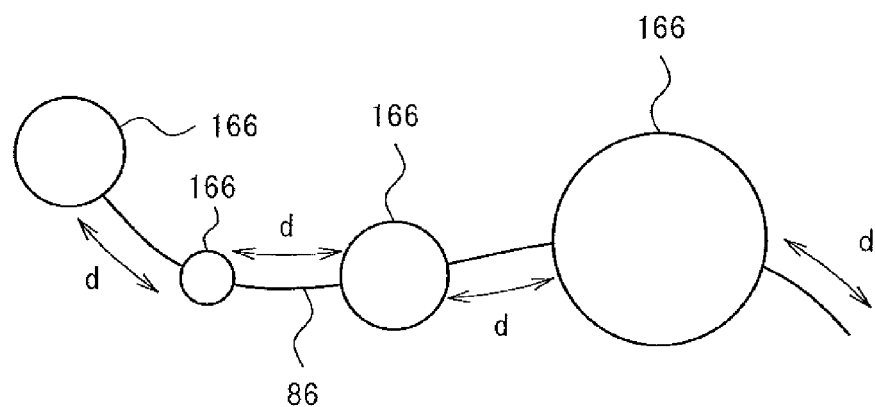
FIG. 11 illustrates an example of a group image layout region.

Then, the group image layout region determining unit 142 lays out the group image layout regions 166 according to the rank order of the groups, in a size corresponding to each of the groups, at given intervals d on the group image object layout reference line 86 (S106). An example of how the group image layout regions 166 are laid out on the group image object layout reference line 86 is illustrated in FIG. 11.

Then, the group image layout region determining unit 142 checks whether or not the group image layout regions 166 are laid out for all the groups (S107). In a case where the group image layout regions 166 are laid out for all the groups (S107: Y), the processing is ended.

In a case where the group image layout regions 166 are laid out for not all the groups (S107: N), the end point of the group image object layout reference line 86 generated in the process illustrated in S105 is defined as another starting point 164 (S108). Then, the process illustrated in S105 is repeated. It should be noted that in this embodiment, in the process illustrated in S105, the group image layout region determining unit 142 alternately generates the group image object layout reference line 86 extending in a lower right direction and the group image object layout reference line 86 extending in a lower left direction.

In this manner, the group image object layout reference line 86 as illustrated in FIG. 5 is generated on the layout plane object 80, and the group image layout regions 166 are laid out to the number of groups, along the group image object layout reference line 86. Then, in this embodiment, the group image object layout reference line 86 extending in a lower right direction and the group image object layout reference line 86 extending in a lower left direction are alternately generated, and accordingly the group image object layout reference line 86 as a whole has a meandering curved geometry as illustrated in FIG. 5.

Figure 12:
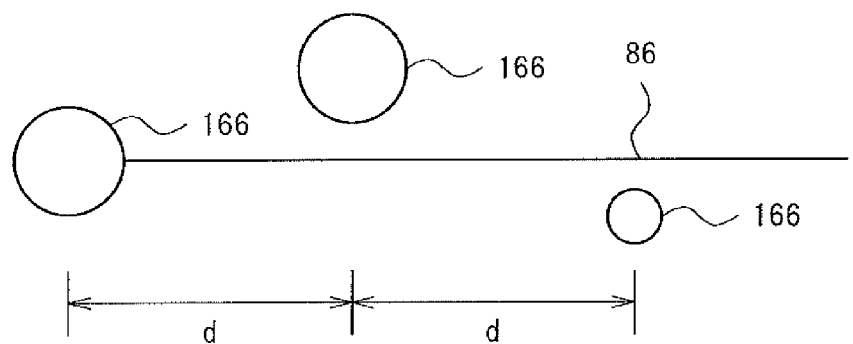
FIG. 12 illustrates another example of the group image layout region.

It should be noted that the group image layout regions 166 may not be provided on the group image object layout reference line 86. Specifically, as illustrated in FIG. 12 for example, in a case where the number of groups is small, the group image layout region determining unit 142 may lay out the group image layout regions 166 alternately on both sides of the group image object layout reference line 86, which is a straight line.

Figure 13:
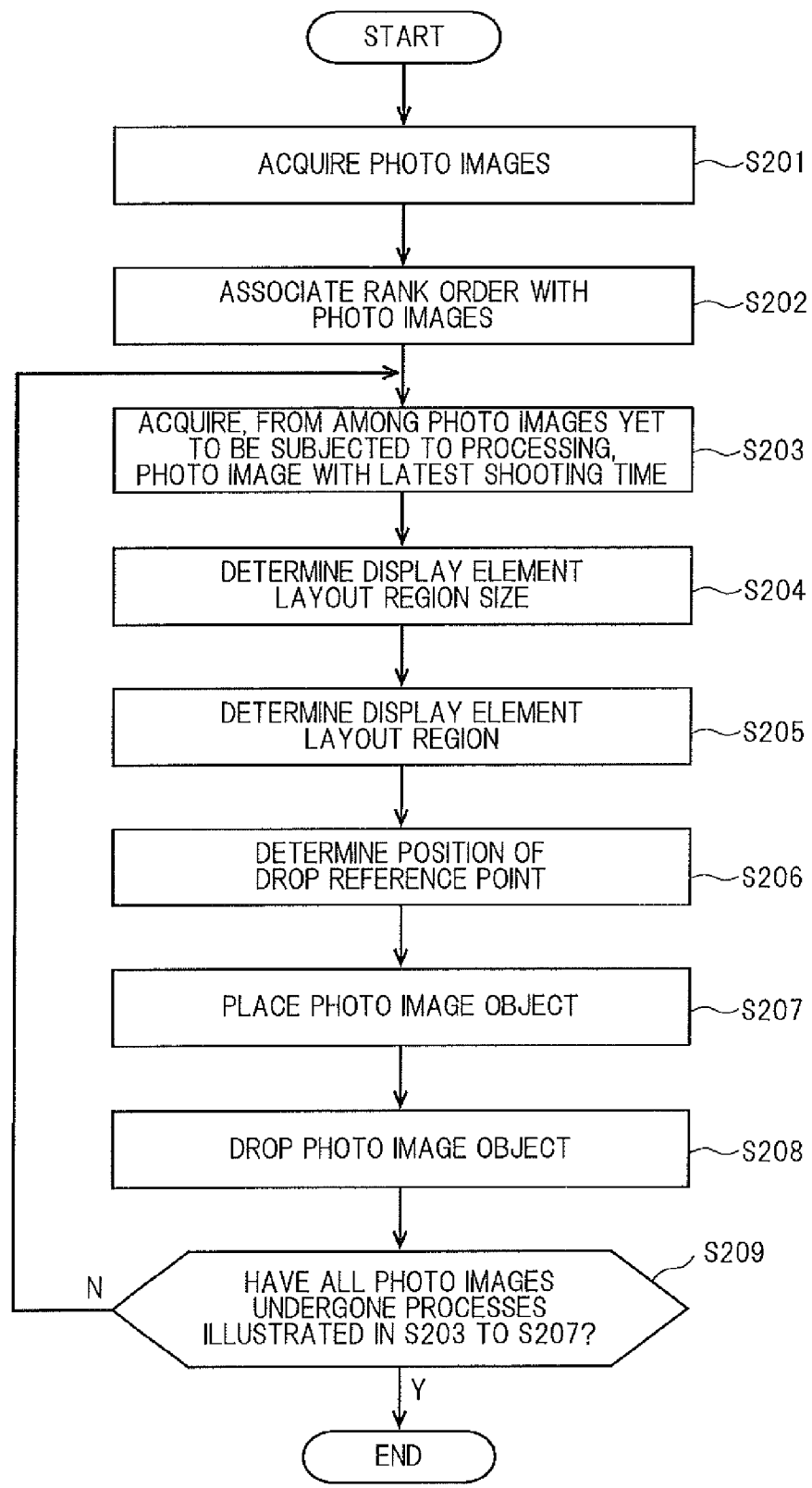
FIG. 13 is a flow chart illustrating another example of a process flow performed by the image display apparatus according to the embodiment.

Next, a description is given of the display element layout process of laying out the group image objects 78 formed of one or a plurality of photo image objects 74 on the group image layout regions 166. In the display element layout process, a group image object 78 is placed on each group image layout region 166. Accordingly, in the following, a description is given of an example of a flow of a process of placing the group image object 78 on one group image layout region 166, with reference to the flow chart illustrated in FIG. 13.

Figure 14:
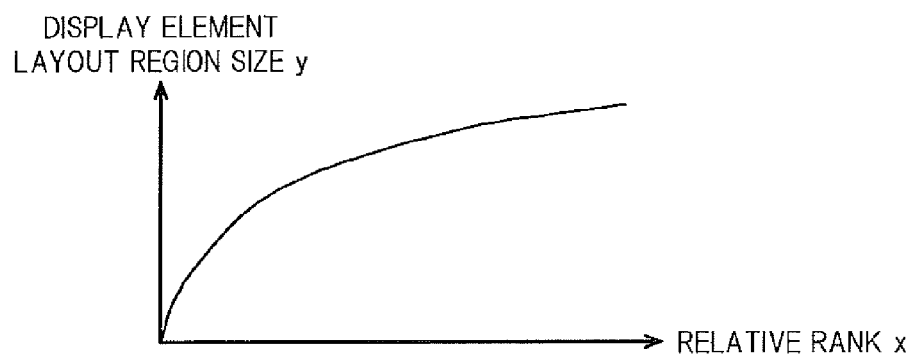
FIG. 14 illustrates an example of a relation between the rank order and the size of a display image layout region.
Figure 15:
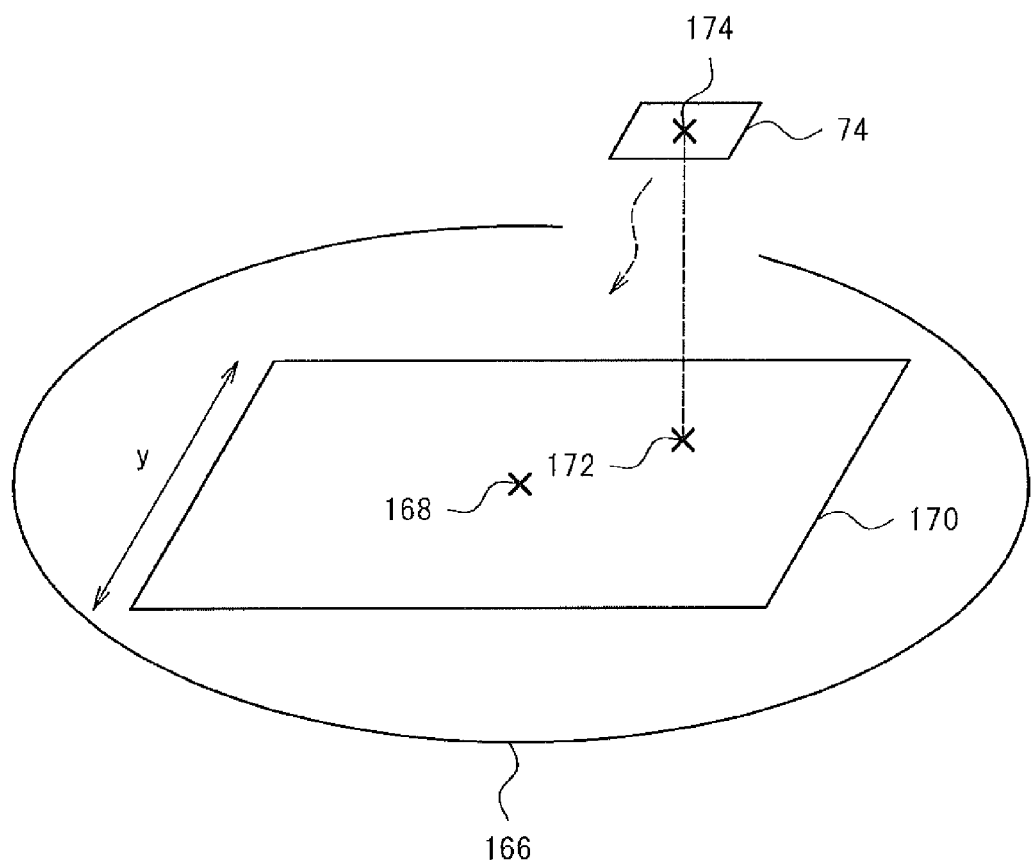
FIG. 15 illustrates an example of the display element layout region.

First, the display element acquiring unit 144 acquires one or a plurality of photo images belonging to a group to be laid out (S201). Then, the display element acquiring unit 144 sorts the photo images acquired in the process illustrated in S201 in order of shooting time thereof, and associates the order with the photo images (S202). Then, the display element acquiring unit 144 acquires, from among the photo images yet to be subjected to the processing, a photo image with the largest rank (that is, a photo image with the latest shooting time) (S203). Then, the display element layout region determining unit 146 determines a display element layout region size corresponding to the rank (S204). The rank order and the display element layout region size are in a relation as illustrated in, for example, FIG. 14. Specifically, for example, the relation is expressed as $y = x^{(1/5)}$ (x: relative rank (for example, rank obtained by normalizing the rank in the group, according to a predetermined rule), y: display element layout region size). Then, the display element layout region determining unit 146 determines a display element layout region 170 as illustrated in FIG. 15, which is a rectangle with a side corresponding in length to a display element layout region size y determined in the process of S204 on the layout plane object 80, the display element layout region 170 centering on a layout reference point 168 (for example, barycenter) in the group image layout region 166 (S205). FIG. 15 illustrates an example of the display element layout region 170. As described above, the display element layout region determining unit 146 in this embodiment determines the display element layout region 170 which increases in size according to, for example, the rank order.

Then, the display element layout unit 148 determines a position of a drop start reference point 172 in the display element layout region 170 based on a random number (S206). Then, the display element layout unit 148 places the photo image object 74, which is a rectangular object to which photo images to be laid out are mapped, on a region centering on a drop start point 174 which is spaced apart from the drop start reference point 172 at a given distance (S207). It should be noted that the drop start point 174 is disposed on the viewpoint 76 side with respect to the layout plane object 80.

Then, the display element layout unit 148 drops the photo image object 74 toward the layout plane object 80 according to given motion data (for example, motion data based on a physical simulation) (S208). The motion data is stored in advance in a storage device, such as, for example, the main memory 20 or the hard disk drive 38. Then, it is checked whether all the photo image objects 74 have undergone the processes illustrated in S203 to S208 (S209). In a case where the processes illustrated in S203 to S208 are performed for all the photo image objects 74 (S209: Y), the process of laying out the group image object 78 is ended. In a case where the processes illustrated in S203 to S208 are performed for not all the photo image objects 74 (S209: N), the process illustrated in S203 is repeated.

In this manner, the display element layout unit 148 drops each of the photo image objects 74 on the layout plane object 80, to thereby place the group image object 78 on the layout plane object 80.

As described above, when the display element layout unit 148 places each of the photo image objects 74, the photo image objects 74 forming the group image object 78 are expected to be stacked substantially in a mound. The photo image objects 74 are expected to be stacked such that a photo image object 74 placed inside (near the summit) may have the shooting time which precedes the shooting time of a photo image object 74 placed outside (near the base). In this manner, according to this embodiment, the user may easily recognize the shooting order of the photo image objects 74 forming the group image object 78.

As described above, the display element layout unit 148 lays out the display elements (in this embodiment, the photo image objects 74) according to the rank order associated therewith, such that the display elements (in this embodiment, the photo image objects 74) to be displayed farther away from a line which passes through the layout reference point 168 on the layout plane object 80 and is perpendicular to the layout plane object 80, approaching the layout plane object 80 provided in the library view space 72, are increased in number. Further, in this embodiment, when the group image object 78 has come into view of the viewpoint 76 (or in the vicinity of view of the viewpoint 76) (that is, when the group image object 78 has come into a region displayed on the screen of the monitor 26 (or in the vicinity of the region)) along with the movement of the viewpoint 76 caused by the library view viewpoint Moving, unit 112, the library view group image layout unit 136 may execute the display element layout process illustrated in S201 to S209 described above, with respect to the group image object 78. In this manner, each time the group image object 78 comes into view of the viewpoint 76 (or in the vicinity of view of the viewpoint 76), the photo image objects 74 forming the group image object 78 are rearranged on the group image layout region 166. Accordingly, each time the group image object 78 comes into view of the viewpoint 76 (or in the vicinity of view of the viewpoint 76), the user may be given a different impression of the group image object 78. The library view viewpoint moving unit 112 is described later in detail.

It should be noted that in the above-mentioned process, the display element layout unit 148 may place each of the photo image objects 74 on the layout plane object 80 by rotating the object by degrees corresponding to the photo image object 74. Specifically, in the process illustrated in S207, the display element layout unit 148 may rotate the photo image object 74 around an axis perpendicular to the layout plane object 80, by degrees determined based on a random number, and place the photo image object 74 on a region centering on the drop start point 174.

It should be noted that in a case where the position of the drop start reference point 172 calculated in the process illustrated in the S206 described above and a position of another photo image object 74 that has already been placed on the layout plane object 80 satisfy a predetermined relation (specifically, in a case where a distance between a position of a central point of the photo image object 74 and a position of the drop start reference point 172 is smaller than a predetermined range, or in a case where a region to be occupied by the photo image object 74 that is placed in the process illustrated in S207 when projected onto the layout plane object 80 and a region occupied by another photo image object 74 overlap across an area which exceeds a predetermined range), the display element layout unit 148 may calculate a position of the drop start reference point 172 again.

Figure 16A:
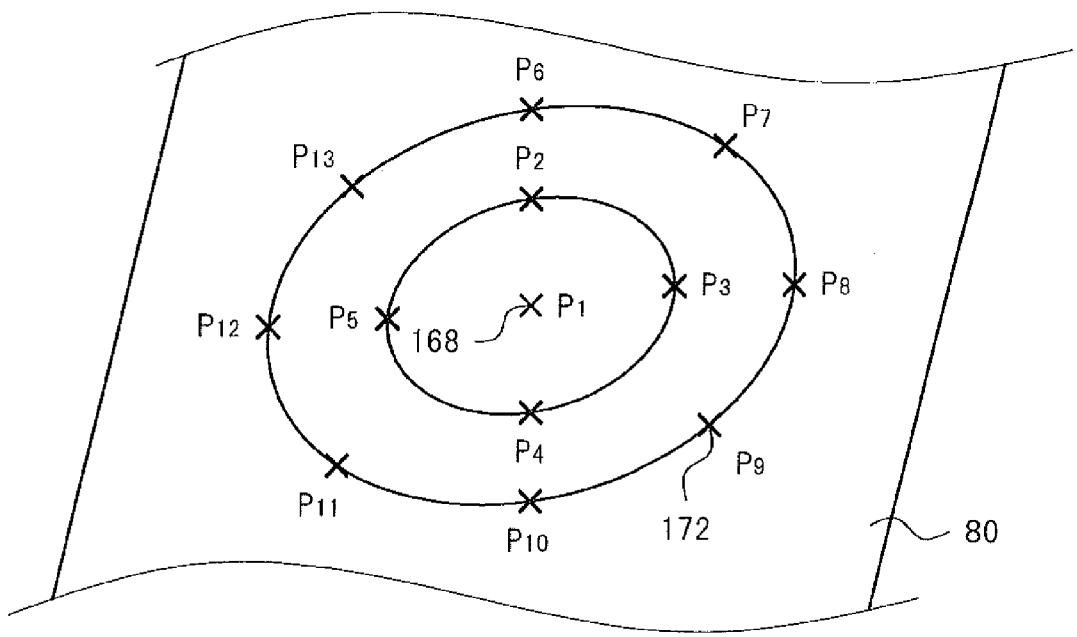
FIG. 16A is an explanatory diagram illustrating an example of a method of determining a drop start reference point.
Figure 16B:
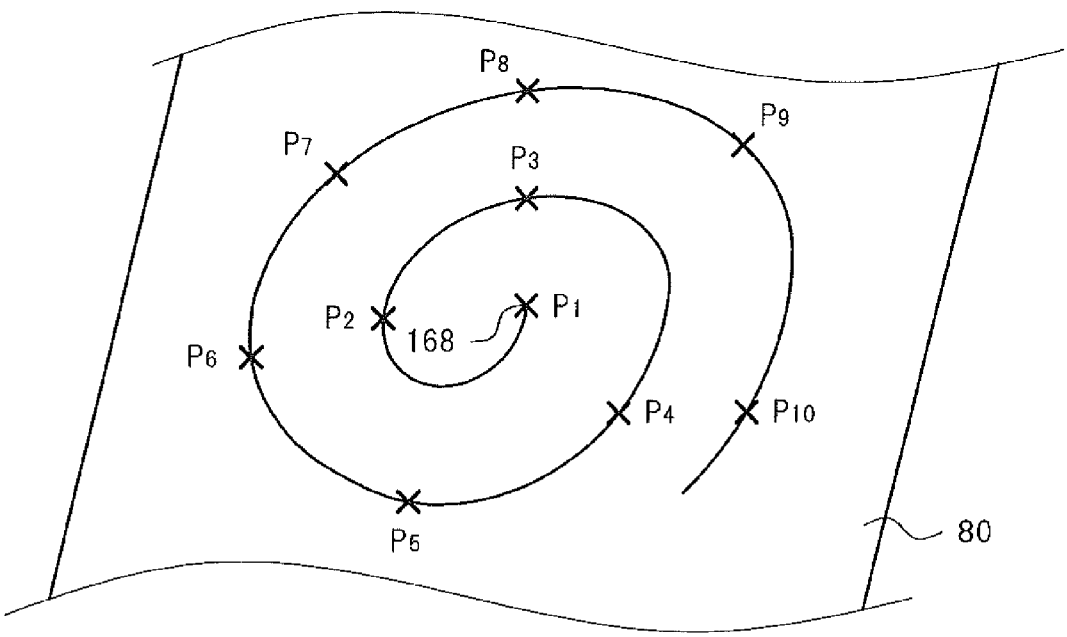
FIG. 16B is an explanatory diagram illustrating another example of the method of determining the drop start reference point.

Further, the flow of the display element layout process is not limited to the example of the process described above. For example, the display element layout region determining unit 146 may determine the drop start reference point 172 for each of the photo image objects 74 such that, as illustrated in FIGS. 16A and 16B, a distance from the layout reference point 168 to the drop start reference point 172 may be increased according to the rank of each of the photo image objects 74. For example, the display element layout region determining unit 146 may place the drop start reference points 172 on points P1, P2, P3 . . . in order such that a distance from the layout reference point 168 increases as the rank of each the photo image objects 74 becomes larger. In the example of FIG. 16A, a trajectory formed by connecting positions of the drop start reference points 172 renders concentric circles. In the example of FIG. 16B, a trajectory formed by connecting positions of the drop start reference points 172 is in a spiral fashion. It should be noted that the display element layout unit 148 may not use motion data to place each of the photo image objects 74 on the layout plane object 80.

The library view representative image layout region determining unit 138 determines a position of the representative image layout region 88, based on at least one of a position of a group image layout reference line (in this embodiment, the group image object layout reference line 86) and a position at which a group image (in this embodiment, the group image object 78) is placed. In this embodiment, a plurality of the representative image layout regions 88 are provided on the layout plane object 80.

Figure 17:
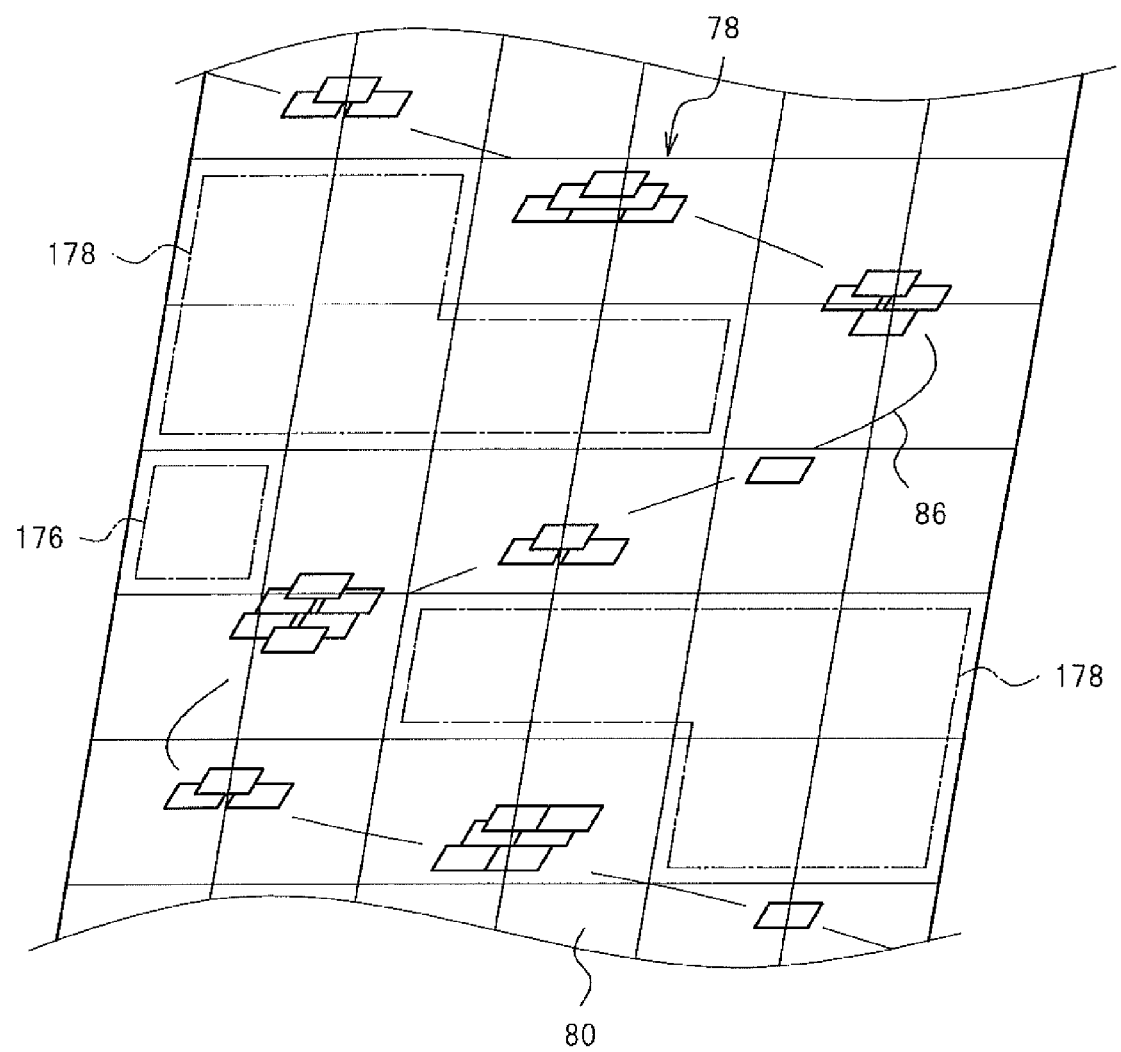
FIG. 17 is an explanatory diagram illustrating an example of a method of defining a representative image layout candidate region.

Specifically, for example, as illustrated in FIG. 17, the library view representative image layout region determining unit 138 defines grid regions 176 of a given size on the layout plane object 80. Then, the library view representative image layout region determining unit 138 extracts, from among the grid regions 176, a representative image layout candidate region 178 of at least two successive grids square on which no photo image object 74 is placed. Then, the library view representative image layout region determining unit 138 designates at least part of the representative image layout candidate region 178, as the representative image layout region 88.

It should be noted that the library view representative image layout region determining unit 138 may not necessarily extract the representative image layout candidate region 178. The position of the representative image layout region 88 may be designated in advance.

The library view representative image layout unit 140 places, on the representative image layout region 88, an image (in this embodiment, photo image) belonging to any one of groups falling within a range on the group image layout reference line (in this embodiment, the group image object layout reference line 86) associated with the representative image layout region 88, as a representative image (in this embodiment, the representative image object 82). At this time, the library view representative image layout unit 140 may place, as the representative image, an image belonging to anyone of groups falling within the range on the group image object layout reference line 86, which is defined based on a distance from a representative point (for example, barycenter) in the representative image layout region 88.

Figure 18:
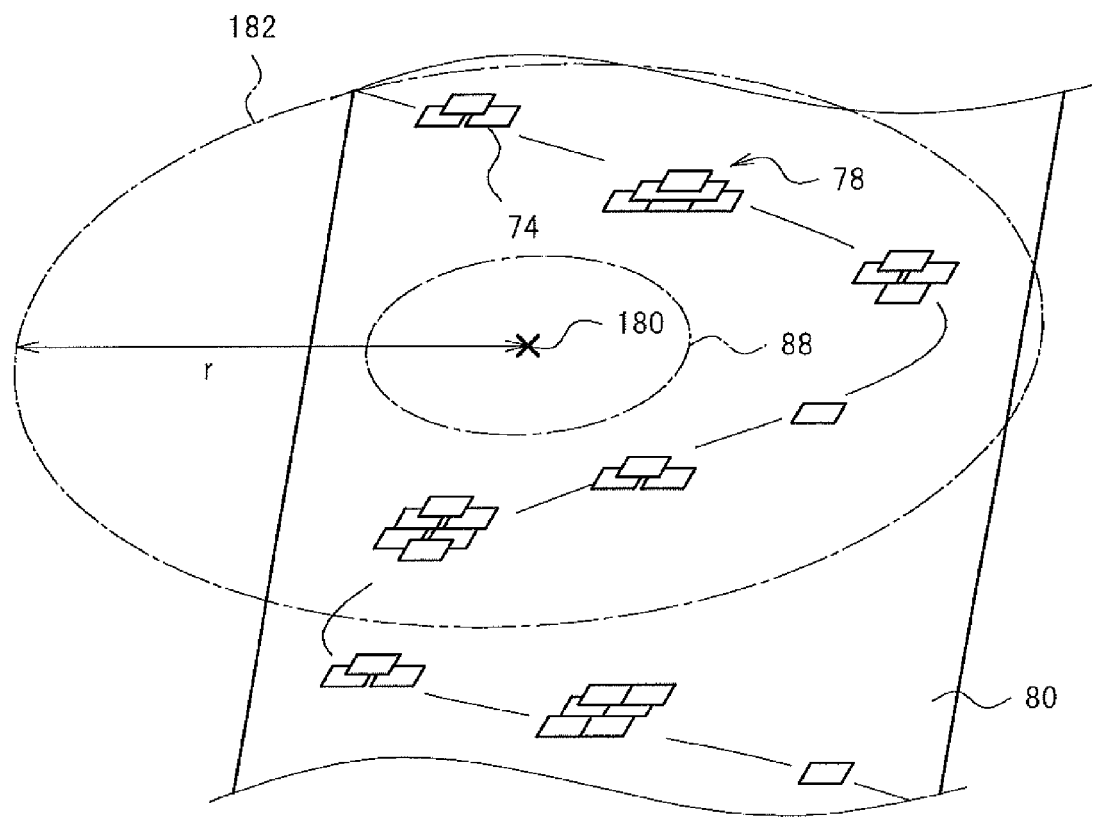
FIG. 18 is an explanatory diagram illustrating an example of a method of determining a representative image.

Specifically, as illustrated in FIG. 18, the library view representative image layout unit 140 selects one or a plurality of the photo image objects 74 placed within a given radius r of a circle region (representative image selection region 182) centering on a representative point in the representative image layout region 88 (representative image layout region representative point 180). In this manner, according to this embodiment, the library view representative image layout unit 140 may place, as the representative image, an image (for example, an image mapped to the photo image object 74) belonging to any one of groups falling within the range on the group image object layout reference line 86, which is at a distance from the representative image layout region representative point 180 falling within a given range (for example, the distance being smaller than a given distance). It should be noted that at this time, an upper limit (for example, 20) may be set on the number of the photo image objects 74 to be selected by the library view representative image layout unit 140. Then, the library view representative image layout unit 140 places, on the representative image layout region 88, a photo image mapped to the selected photo image object 74.

As described above, according to this embodiment, a photo image which is mapped to any one of the photo image objects 74 laid out in the representative image selection region 182 is enlarged and placed in the representative image layout region 88. Accordingly, the user is allowed to readily recognize the types of the photo image objects 74 laid out in the vicinity of the representative image layout region 88.

It should be noted that the library view representative image layout unit 140 may switch photo images to be laid out on the representative image layout region 88 at predetermined time intervals. This allows the user to sequentially recognize, one after another, the photo image objects 74 laid out in the vicinity of the representative image layout region 88. Alternatively, the library view representative image layout unit 140 may place, on the representative image layout region 88, a photo image selected based on a random number. Still alternatively, the library view representative image layout unit 140 may place, on the representative image layout region 88, a photo image belonging to any one of a plurality of groups of consecutive ranks.

Further, in a case where a plurality of the representative image layout regions 88 are provided on the layout plane object 80, as in this embodiment, a photo image mapped to one photo image object 74 may be laid out on the representative image layout regions 88 that are different from each other. In such a case, the library view representative image layout unit 140 may place, as a representative image on the representative image layout region 88, a photo image on a certain one of the representative image layout regions 88, the photo image being different from an image placed on another representative image layout region 88 which is located at a distance falling within a given range from the certain one of the representative image layout regions 88.

The library view cursor image layout unit 128 places the library view cursor image object 84, which is a closed region on the layout plane object 80. In this embodiment, the library view cursor image object 84, which is a closed circular region which glows translucently in the center, is placed on the layout plane object 80.

The library view space displaying unit 130 displays, on the monitor 26, at least part of the display region (in this embodiment, for example, the layout plane object 80).

In the state where the library view screen 70 is displayed on the monitor 26, the library view cursor image moving unit 108 moves the library view cursor image object 84 in the library view space 72 in one of four directions (front, back, right, and left) along the layout plane object 80, in response to an operation signal received by the operation signal receiving unit 102 (for example, the operation signal indicating that the left operation stick 54 has been operated).

The library view image positional relation changing unit 110 changes a relative positional relation between the library view cursor image object 84 and a target image (group image object 78 in this embodiment), in a case where a distance between the library view cursor image object 84 and the target image (group image object 78 in this embodiment) on the layout plane object 80 falls within a predetermined range, such that a distance from the viewpoint 76 to the target image (group image object 78 in this embodiment) becomes smaller than a distance from the viewpoint 76 to the library view cursor image object 84.

Figure 19A:
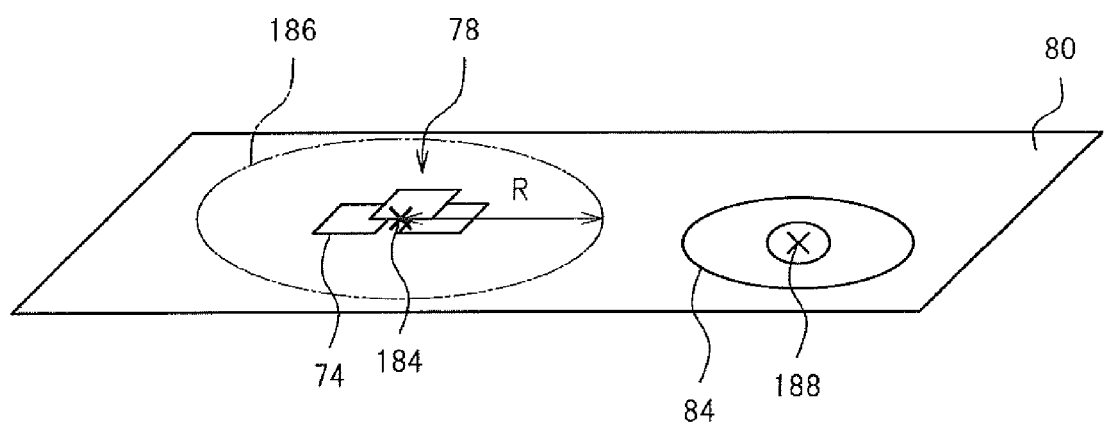
FIG. 19A is an example of a view illustrating a state where the center of a library view cursor image object is not placed within an influential region.
Figure 19B:
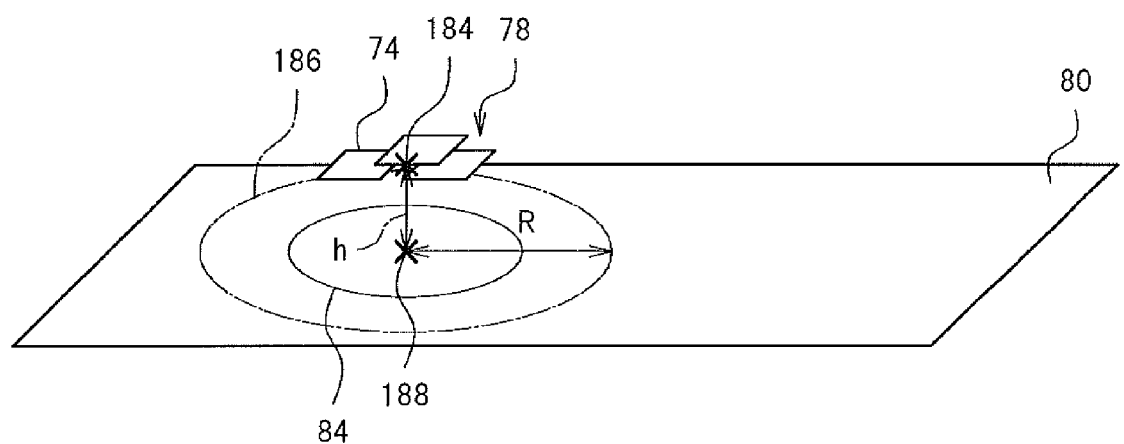
FIG. 19B is an example of a view illustrating a state where the center of the library view cursor image object is placed within the influential region.

Specifically, as illustrated in FIGS. 19A and 19B for example, in a case where a center of the library view cursor image object 84 (library view cursor image object center 188) is placed within a predetermined radius R of a circular region (influential region 186) centering on the representative point of the group image object 78 (group image object representative point 184) on the layout plane object 80, the library view image positional relation changing unit 110 moves each of the photo image objects 74 forming the group image object 78 such that a distance from the layout plane object 80 may be changed by a predetermined distance h (for example, moves each of the photo image objects 74 away from the layout plane object 80). It should be noted that FIG. 19A is an example of a view illustrating a state where the library view cursor image object center 188 is not placed within the influential region 186. FIG. 19B is an example of a view illustrating a state where the library view cursor image object center 188 is placed within the influential region 186. In this manner, the group image object 78 selected by the library view cursor image object 84 is displayed distinctively. In this embodiment, the group image object 78 designated by the library view cursor image object 84 hides the central portion of the library view cursor image object 84, whereas the photo image objects 74 designated by the library view cursor image object 84 floats above the layout plane object 80, to thereby allow the user to identify the group image object 78 designated by the library view cursor image object 84.

It should be noted that, as illustrated in FIGS. 19A and 19B, the library view cursor image object 84 may be larger in size than the group image object 78.

Figure 20:
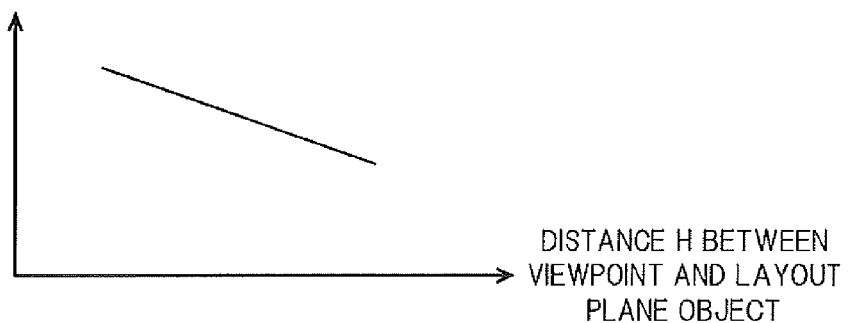
FIG. 20 illustrates an example of a relation between a distance at which a photo image object is spaced apart from a layout plane object and a distance between a viewpoint and the layout plane object.

It should be noted that the library view image positional relation changing unit 110 may define the distance h at which the photo image object 74 is spaced apart from the layout plane object 80, based on a distance H between the viewpoint 76 and the layout plane object 80 (see FIG. 20). Specifically, as illustrated in FIG. 20 for example, the library view image positional relation changing unit 110 defines the distance h at which the photo image object 74 is spaced apart from the layout plane object 80, such that the distance h decreases as the distance H between the viewpoint 76 and the layout plane object 80 increases. FIG. 20 is a graph illustrating an example of a relation between the distance h at which the photo image object 74 is spaced apart from the layout plane object 80 and the distance H between the viewpoint 76 and the layout plane object 80.

The radius R described above is determined in accordance with, for example, the size of the group image object 78 or the distance H between the viewpoint 76 and the layout plane object 80. More specifically, the radius R is proportional to, for example, a product of a radius of a region occupied by the group image object 78 on the layout plane object 80 and the distance H between the viewpoint 76 and the layout plane object 80.

In the state where the group image object 78 is spaced apart from the layout plane object 80 (in other words, the group image object 78 is designated by the library view cursor image object 84) as described above, when the operation signal receiving unit 102 has received an operation signal indicating that a predetermined button (for example, the right button 58R) has been depressed, the view switching unit 104 may generate the tile view space 92, in which the viewpoint 76 is disposed at a position such that the photo image objects 74 belonging to a group associated with the group image object 78 designated by the library view cursor image object 84 may be displayed on the upper edge of the monitor 26. Then, the view switching unit 104 may display, on the monitor 26, the tile view screen 90 depicting a scene viewed from the viewpoint 76 thus disposed.

As described above, in a state where the group image object 78 is spaced apart from the layout plane object 80 (in other words, the group image object 78 is displayed distinctively), the library view cursor image moving unit 108 may move the library view cursor image object 84 closer to the group image object 78 according to the distance between the library view cursor image object center 188 and the group image object representative point 184.

Figure 21:
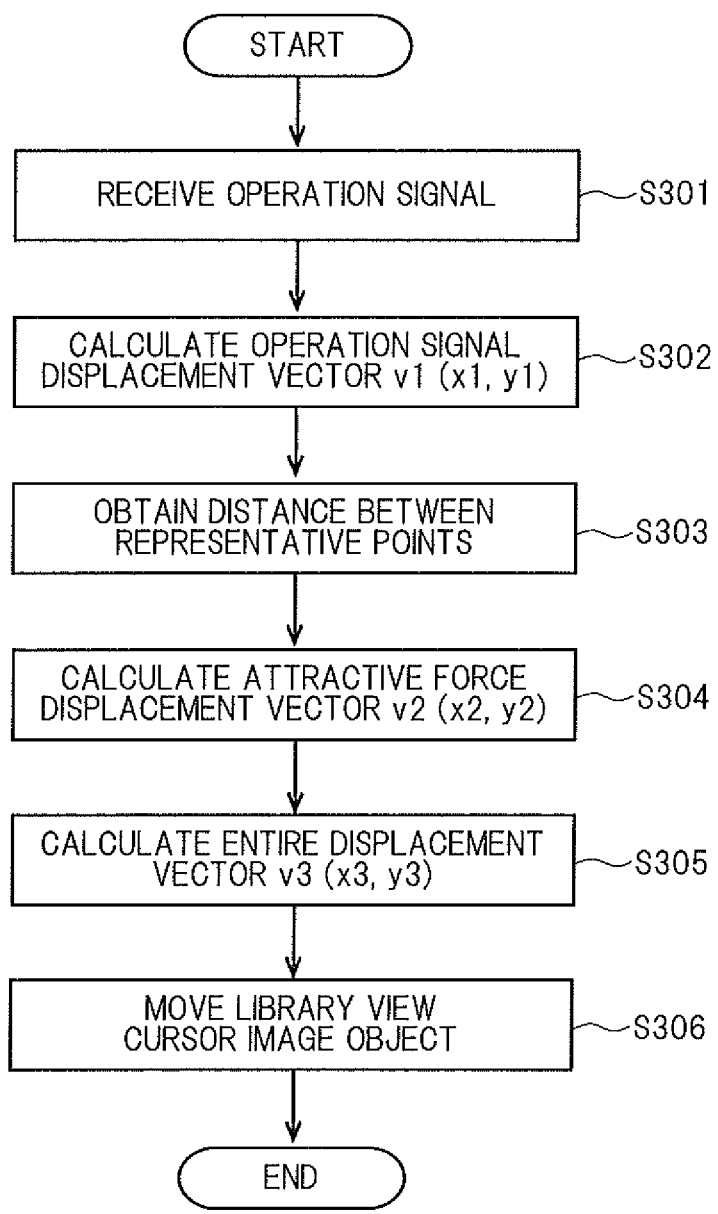
FIG. 21 is a flow chart illustrating a further example of a process flow performed by the image display apparatus according to the embodiment.

Now, a description is given of an exemplary flow of a process of moving the library view cursor image object 84 in a state where the group image object 78 is spaced apart from the layout plane object 80, with reference to a flow chart illustrated in FIG. 21.

Figure 22:
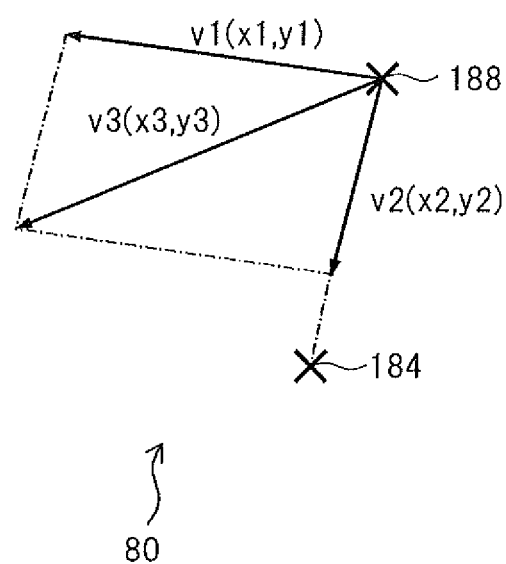
FIG. 22 illustrates examples of an operation signal displacement vector, an attraction force displacement vector, and an entire displacement vector.

First, the operation signal receiving unit 102 receives an operation signal with respect to the controller 42 (S301). Then, the library view cursor image moving unit 108 calculates, based on a digital value indicated by the operation signal, an operation signal displacement vector v1 (x1, y1) (S302). FIG. 22 illustrates an example of the operation signal displacement vector v1 (x1, y1). Then, the library view cursor image moving unit 108 obtains a distance between the library view cursor image object center 188 and the group image object representative point 184 (S303). Then, based on the distance obtained in the process illustrated in S303, an attractive force displacement vector v2 (x2, y2) is calculated (S304). FIG. 22 illustrates an example of the attractive force displacement vector v2 (x2, y2). Here, the attractive force displacement vector v2 (x2, y2) is directed to, for example, the group image object representative point 184 from the library view cursor image object center 188, and corresponds in magnitude to the distance obtained in the process illustrated in S303. At this time, for example, the norm of the attractive force displacement vector v2 (x2, y2) increases as the distance obtained in the process illustrated in S303 decreases. It should be noted that the magnitude of the attractive force displacement vector v2 (x2, y2) may vary in accordance with (for example, inversely proportional to) the radius R (radius of the influential region 186) described above.

Then, the library view cursor image moving unit 108 calculates an entire displacement vector v3 (x3, y3) (S305). For example, the library view cursor image moving unit 108 calculates the entire displacement vector v3 (x3, y3) by following an equation such as v3 (x3, y3)=v1 (x1, y1)+v2 (x2, y2). FIG. 22 illustrates an example of the entire displacement vector v3 (x3, y3). Then, the library view cursor image moving unit 108 moves the library view cursor image object 84 by the entire displacement vector v3 (x3, y3), along the layout plane object 80 (S306).

As described above, the library view cursor image moving unit 108 moves the library view cursor image object 84 closer to the group image object 78, which allows the group image object 78 to be selected with ease using the library view cursor image object 84.

In a state where the library view screen 70 is displayed on the monitor 26, the library view viewpoint moving unit 112 moves, in response to an operation signal (for example, operation signal indicating that the right operation stick 56 has been operated) received by the operation signal receiving unit 102, a position of the viewpoint 76 in the library view space 72 in a perpendicular direction with respect to the layout plane object 80. In this manner, according to this embodiment, the library view viewpoint moving unit 112 changes the direction between the viewpoint 76 and the layout plane object 80. In other words, the library view viewpoint moving unit 112 changes the size of the region to be displayed on the screen of the monitor 26. Further, according to this embodiment, the library view viewpoint moving unit 112 moves a position of the viewpoint 76 in the library view space 72 along the layout plane object 80, in a case where a position at which the library view cursor image object 84 is to be displayed falls outside a predetermined range in the monitor 26.

The library view distinctiveness degree changing unit 114 changes a degree of distinctiveness of a display element, according to the change in size of the region to be displayed on the screen of the monitor 26. Specifically, for example, the library view distinctiveness degree changing unit 114 changes a distance to each object forming the display element (for example, each photo image object 74 forming the group image object 78) from the layout plane object 80, according to a variation in the distance between the viewpoint 76 and the layout plane object 80. More specifically, for example, when the library view viewpoint moving unit 112 has moved the position of the viewpoint 76 as described above, the library view distinctiveness degree changing unit 114 changes a distance to each photo image object 74 forming the group image object 78 from the layout plane object 80 such that each photo image object 74 forming the group image object 78 may be spaced apart from the layout plane object 80 at a distance corresponding to the distance H between the viewpoint 76 thus moved and the layout plane object 80.

It should be noted that the library view distinctiveness degree changing unit 114 may change a display mode of the library view cursor image object 84 in terms of, for example, transparency and luminance (for example, intensity of light for illuminating the library view cursor image object 84), based on the distance H between the viewpoint 76 thus moved and the layout plane object 80. Specifically, for example, the library view cursor image object 84 may be increased in transparency or in luminance as the distance H between the viewpoint 76 and the layout plane object 80 becomes smaller. More specifically, for example, the transparency or the luminance of the library view cursor image object 84 may be changed proportional to the distance H between the viewpoint 76 and the layout plane object 80.

The tile view space generating and displaying unit 116 generates the tile view space 92 illustrated in FIG. 7 and displays the tile view screen 90 on the monitor 26. As described above, in this embodiment, the tile view space generating and displaying unit 116 includes the tile view target image layout unit 150 and the tile view distinctive displaying unit 152.

The tile view target image layout unit 150 places at least one target image (for example, the photo image object 74) on the layout plane object 80 in the tile view space 92. As described above, the tile view target image layout unit 150 includes the tile view image acquiring unit 154, the tile view image classifying unit 156, and the tile view image layout unit 158.

The tile view image acquiring unit 154, similarly to the library view image acquiring unit 132, acquires a plurality of images (for example, photo images) stored in the image storage unit 100.

The tile view image classifying unit 156, similarly to the library view image classifying unit 134, classifies the plurality of images acquired by the tile view image acquiring unit 154 into one or a plurality of groups which have a rank order associated therewith. In this embodiment, specifically, the tile view image classifying unit 156 classifies the plurality of photo images into one or a plurality of groups based on the attribute, for example, shooting date, associated with each of the photo images.

The tile view image layout unit 158 aligns and places, for each group, a target image object (photo image object 74 in this embodiment) which has target images (for example, photo images) belonging to the group placed thereon, on the layout plane object 80. It should be noted that a character string for describing the name of the group may be displayed, in the vicinity of the photo image object 74 thus aligned on the layout plane object 80.

The tile view distinctive displaying unit 152 displays distinctively at least one of the plurality of display elements (in this embodiment, for example, the photo image objects 74) displayed on the monitor 26. As described above, in this embodiment, the tile view distinctive displaying unit 152 includes the tile view cursor image layout unit 160 and the tile view space displaying unit 162.

The tile view cursor image layout unit 160 places the tile view cursor image object 94 designating at least one of the photo image objects 74, at a position corresponding to the photo image object 74 which is displayed distinctively (for example, between the photo image object 74 and the layout plane object 80). At this time, the tile view cursor image layout unit 160 may place the tile view cursor image object 94 such that, for example, the barycenter of the photo image object 74 and the barycenter of the tile view cursor image object 94 may be aligned on a straight line which is perpendicular to the layout plane object 80. In this embodiment, the tile view cursor image object 94 is larger in size than the photo image object 74.

The tile view space displaying unit 162 displays, on the monitor 26, an image illustrating, at least part of the region which has the plurality of display elements (in this embodiment, for example, the photo image objects 74) laid out thereon.

In the state where the tile view screen 90 is displayed on the monitor 26, the tile view cursor image moving unit 118 moves the tile view cursor image object 94 in the tile view space 92 to a position between an adjacent photo image object 74 on one of front, back, right, and left, and the layout plane object 80, in response to an operation signal received by the operation signal receiving unit 102 (for example, the operation signal indicating that the left operation stick 54 has been operated). In this manner, the photo image object 74 designated by the tile view cursor image object 94 is changed.

The tile view image positional relation changing unit 120 changes a distance between the layout plane object 80 and the photo image object 74 designated by the tile view cursor image object 94. Specifically, the tile view image positional relation changing unit 120 changes, for example, the distance from the layout plane object 80 to the photo image object 74 designated by the tile view cursor image object 94. More specifically, for example, the tile view image positional relation changing unit 120, specifically, for example, moves the photo image object 74 designated by the tile view cursor image object 94 to be spaced apart from the layout plane object 80. At this time, the tile view image positional relation changing unit 120 may move the photo image object 74 to be spaced apart from the layout plane object 80 by a distance determined based on the distance between the viewpoint 76 and the layout plane object 80. Specifically, for example, as illustrated in FIG. 20, the tile view image positional relation changing unit 120 may move the photo image object 74 to be spaced apart from the layout plane object 80 by a smaller distance as the distance between the viewpoint 76 and the layout plane object 80 increases. It should be noted that the relation between the distance separating the object and the distance from the viewpoint 76 to the object may be common to or different between the library view space 72 and the tile view space 92.

In the state where the tile view screen 90 is displayed on the monitor 26, the tile view viewpoint moving unit 122 moves the position of the viewpoint 76 in the tile view space 92 in a perpendicular direction with respect to the layout plane object 80, in response to an operation signal (for example, an operation signal indicating that the right operation stick 56 has been operated or an operation signal indicating that the right button 58R has been operated) received by the operation signal receiving unit 102. In this manner, according to this embodiment, the tile view viewpoint moving unit 122 changes the distance between the viewpoint 76 and the layout plane object 80, in response to an operation signal received by the operation signal receiving unit 102. In other words, the library view viewpoint moving unit 112 changes the size of a region to be displayed on the screen of the monitor 26, according to an operation signal received by the operation signal receiving unit 102. Further, in this embodiment, the tile view viewpoint moving unit 122 moves a position of the viewpoint 76 in the tile view space 92 along the layout plane object 80, in a case where a position at which the tile view cursor image object 94 is to be displayed falls outside a predetermined range in the monitor 26.

It should be noted that when the tile view viewpoint moving unit 122 moves the position of the viewpoint 76 in the tile view space 92 closer to the layout plane object 80, the position of the viewpoint 76 in the tile view space 92 may be moved along the layout plane object 80 such that the photo image object 74 designated by the tile view cursor image object 94 may be displayed in the center of the tile view screen 90.

The tile view distinctiveness degree changing unit 124 changes a degree of distinctiveness of a display element, according to the change in size of the region to be displayed on the screen of the monitor 26. Specifically, for example, when the tile view viewpoint moving unit 122 has moved the position of the viewpoint 76 as described above, the tile view distinctiveness degree changing unit 124 changes a distance to each photo image object 74 forming the group image object 78 from the layout plane object 80 such that each photo image object 74 forming the group image object 78 may be spaced apart from the layout plane object 80 by a distance corresponding to the distance H between the viewpoint 76 thus moved and the layout plane object 80.

It should be noted that the tile view distinctiveness degree changing unit 124 may change a display mode of the tile view cursor image object 94 in terms of, for example, transparency and luminance (for example, intensity of light for illuminating the tile view cursor image object 94), based on the distance H between the viewpoint 76 thus moved and the layout plane object 80. Specifically, for example, the tile view cursor image object 94 may be increased in transparency or in luminance as the distance H between the viewpoint 76 and the layout plane object 80 becomes smaller. More specifically, for example, the transparency or the luminance of the tile view cursor image object 94 may be changed proportional to the distance H between the viewpoint 76 and the layout plane object 80.

In a case where the distance H between the viewpoint 76 and the layout plane object 80 is small (that is, the number of the photo image objects 74 displayed on the tile view screen 90 is small) as illustrated in FIG. 6B, the photo image object 74 designated by the tile view cursor image object 94 is spaced apart from the layout plane object 80 by a smaller distance compared to a case where the distance H between the viewpoint 76 and the layout plane object 80 is large (that is, the number of the photo image objects 74 displayed on the tile view screen 90 is large) as illustrated in FIG. 6A. Alternatively, in a case where the distance H between the viewpoint 76 and the layout plane object 80 is small, the tile view cursor image object 94 is reduced in transparency and luminance compared to a case where the distance H between the viewpoint 76 and the layout plane object 80 is large. It should be noted that in the state where the photo image object 74 is spaced apart from the layout plane object 80 by a shorter distance as illustrated in FIG. 6B, when the operation signal receiving unit 102 receives an operation signal indicating that a predetermined button (for example, the right button 58R) has been depressed, the tile view distinctiveness degree changing unit 124 may display, in an enlarged manner, a photo image mapped to the photo image object 74 designated by the tile view cursor image object 94, on the monitor 26.

In this manner, the photo image object 74 designated by the tile view cursor image object 94 may be presented to the user in a display mode suited to the distance H between the viewpoint 76 and the layout plane object 80. Further, according to this embodiment, when the tile view viewpoint moving unit 122 moves the position of the viewpoint 76 in the tile view space 92 closer with respect to the layout plane object 80, the position of the viewpoint 76 in the tile view space 92 is moved along the layout plane object 80 such that the photo image object 74 designated by the tile view cursor image object 94 may be displayed in the center of the tile view screen 90, which allows the user to easily identify the designated photo image object 74 even if the tile view cursor image object 94 is reduced in transparency or luminance because the distance h separating the photo image object 74 away from the layout plane object 80 is reduced as the position of the viewpoint 76 approaches the layout plane object 80.

It should be noted that the present invention is not limited to the embodiment described above.

For example, in the library view space 72, the entertainment system 10 may copy each photo image object 74 forming the group image object 78 designated by the library view cursor image object 84 into the play list space, in response to an operation signal received from the user. Alternatively, the entertainment system 10 may sequentially display the photo image objects 74 disposed in the play list space, in the form of a slide show on the monitor 26, in response to an operation signal received from the user.

Alternatively, for example, the present invention may be applied to the entertainment system 10 which operates as the image display apparatus for displaying a planar shape in a two-dimensional coordinate system on the monitor 26.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. An image display apparatus, comprising:
an image acquiring unit that acquires a plurality of images;
an image classifying unit that classifies the plurality of images into a plurality of groups having a rank order associated therewith;
a group image layout unit that places respective group images corresponding to each of the plurality of groups, according to the rank order of the groups, along a group image layout reference line which is a curved line including a portion extending in a lower right direction and a portion extending in a lower left direction provided in a display region;
a defining unit that defines grid regions of a first given size in the display region;
an extracting unit that extracts, from among the grid regions, respective sets of successive grid regions on which no group image is placed as respective representative image layout candidate regions, where respective sizes of the representative image layout candidate regions are larger than a second given size;
a designating unit that designates, among the representative image layout candidate regions, a plurality of representative image layout regions;
a representative image layout unit that: (i) places a respective representative image on each of the designated representative image layout regions, each of the respective representative images being selected from among the plurality of images belonging to any one of the plurality of groups represented by one of the respective group images on the group image layout reference line that is displayed within a circular boundary defined by a predetermined radius from a predetermined point within the respective representative image layout region; and (ii) repeats the selection and placement such that new respective representative images are displayed on each of the designated representative image layout regions at one or more predetermined time intervals; and
a displaying unit that displays, on a screen, at least part of the display region.

2. The image display apparatus according to claim 1, wherein the representative image layout unit places, as the representative image, at least one image of the plurality of images, the at least one image belonging to any one of the plurality of groups of consecutive ranks.

3. The image display apparatus according to claim 1, wherein the representative image layout unit places, as the representative image, at least one image of the plurality of images, the at least one image being selected based on a random number.

4. The image display apparatus according to claim 1, wherein the image classifying unit classifies the plurality of images into the one or the plurality of groups, based on an attribute associated with each of the plurality of images.

5. The image display apparatus according to claim 1, wherein the display region has a plurality of the representative image layout regions provided therein.

6. The image display apparatus according to claim 5, wherein the representative image layout unit places, in one of the plurality of the representative image layout regions, an image as the representative image in the one of the plurality of the representative image layout regions, the image being different from an image placed in another one of the plurality of the representative image layout regions which is spaced apart from the one of the plurality of the representative image regions at a distance falling within a predetermined range from a representative point in the one of the plurality of the representative image layout regions.

7. An image display method, comprising:
acquiring a plurality of images;

classifying the plurality of images into a plurality of groups having a rank order associated therewith;

placing respective group images corresponding to each of the plurality of groups, according to the rank order of the groups, along a group image layout reference line which is a curved line including a portion extending in a lower right direction and a portion extending in a lower left direction provided in a display region;

defining grid regions of a first given size in the display region;

extracting, from among the grid regions, respective sets of successive grid regions on which no group image is placed as a-respective representative image layout candidate regions, where respective sizes of the representative image layout candidate regions are larger than a second given size;

designating, among the representative image layout candidate regions, a plurality of representative image layout regions;

placing a respective representative image on each of the designated representative image layout regions, each of the respective representative images being selected from among the plurality of images belonging to any one of the plurality of groups represented by one of the respective group images on the group image layout reference line that is displayed within a circular boundary defined by a predetermined radius from a predetermined point within the respective representative image layout region;

repeating the selecting and placing steps such that new respective representative images are displayed on each of the designated representative image layout regions at one or more predetermined time intervals; and displaying, on a screen, at least part of the display region.

8. A non-transitory computer-readable information storage medium storing a program which is to be executed by a computer, the program including instructions to:

acquire a plurality of images;

classify the plurality of images into a plurality of groups having a rank order associated therewith;

place respective group images corresponding to each of the plurality of groups, according to the rank order of the groups, along a group image layout reference line which is a curved line including a portion extending in a lower right direction and a portion extending in a lower left direction provided in a display region;

define grid regions of a first given size in the display region;

extract, from among the grid regions, respective sets of successive grid regions on which no group image is placed as respective representative image layout candidate regions, where respective sizes of the representative image layout candidate regions are larger than a second given size;

designate, among the representative image layout candidate regions, a plurality of representative image layout regions;

place a respective representative image on each of the designated representative image layout regions, each of the respective representative images being selected from among the plurality of images belonging to any one of the plurality of groups represented by one of the respective group images on the group image layout reference line that is displayed within a circular boundary defined by a predetermined radius from a predetermined point within the respective representative image layout region;

repeat the selecting and placing steps such that new respective representative images are displayed on each of the designated representative image layout regions at one or more predetermined time intervals; and display, on a screen, at least part of the display region.

\* \* \* \* \*